United States Patent
Younis

(10) Patent No.: US 10,484,957 B2
(45) Date of Patent: Nov. 19, 2019

(54) SYSTEMS AND METHODS FOR INDOOR POSITIONING USING WIRELESS POSITIONING NODES

(71) Applicant: Lonprox Corporation, San Diego, CA (US)

(72) Inventor: Saed Younis, San Diego, CA (US)

(73) Assignee: LONPROX CORPORATION, San Diego, CA (US)

( * ) Notice: Subject to any disclaimer, the term of this patent is extended or adjusted under 35 U.S.C. 154(b) by 0 days.

(21) Appl. No.: 16/024,399

(22) Filed: Jun. 29, 2018

(65) Prior Publication Data

US 2018/0310272 A1   Oct. 25, 2018

Related U.S. Application Data

(63) Continuation of application No. 15/924,093, filed on Mar. 16, 2018, now Pat. No. 10,015,769.

(Continued)

(51) Int. Cl.
*H04W 64/00* (2009.01)
*H04W 4/33* (2018.01)
(Continued)

(52) U.S. Cl.
CPC ........... *H04W 64/00* (2013.01); *G01S 5/0236* (2013.01); *G01S 5/10* (2013.01); *H04W 4/33* (2018.02); *H04W 4/02* (2013.01); *H04W 56/001* (2013.01)

(58) Field of Classification Search
CPC ......... H04W 64/00; H04W 4/33; H04W 4/02; H04W 56/001; G01S 5/0236; G01S 5/10
See application file for complete search history.

(56) References Cited

U.S. PATENT DOCUMENTS

2011/0007650 A1   1/2011   Nam et al.
2011/0230206 A1*  9/2011   Kennedy, Jr. ......... G01S 5/0252
                                                           455/456.1
(Continued)

FOREIGN PATENT DOCUMENTS

CN           205176258 U      4/2016

OTHER PUBLICATIONS

International Search Report and Written Opinion for PCT application No. PCT/US2018/023005, dated Jun. 29 2018, in 14 pages.

*Primary Examiner* — Khai M Nguyen
(74) *Attorney, Agent, or Firm* — Procopio, Cory, Hargreaves & Savitch LLP

(57) ABSTRACT

This disclosure provides systems and methods for determining a location of a mobile device within an indoor environment. An embodiment of the system can have one or more positioning nodes (PONs), each having one or more antennas. Each PON can be disposed at a location within indoor environment and configured to transmit signals via the one or more antennas. The signals transmitted from the antennas of the PONs can be synchronized in time and frequency. A server communicatively coupled to the PONs and storing aiding information, including location and signal information related to the PONs, can transmit the aiding information to a mobile device. The mobile device can receive the signals from use the PONs and use the aiding information to determine a three dimensional position within the indoor environment based on one-way time difference of arrival of the signals.

20 Claims, 7 Drawing Sheets

Related U.S. Application Data

(60) Provisional application No. 62/561,097, filed on Sep. 20, 2017, provisional application No. 62/532,279, filed on Jul. 13, 2017, provisional application No. 62/472,412, filed on Mar. 16, 2017.

(51) Int. Cl.
*G01S 5/02* (2010.01)
*G01S 5/10* (2006.01)
*H04W 56/00* (2009.01)
*H04W 4/02* (2018.01)

(56) References Cited

U.S. PATENT DOCUMENTS

| | | | |
|---|---|---|---|
| 2016/0054440 A1* | 2/2016 | Younis | G01S 13/753 342/5 |
| 2016/0061957 A1* | 3/2016 | Li | G01S 19/47 342/357.42 |
| 2016/0255463 A1 | 9/2016 | Das et al. | |
| 2017/0052247 A1 | 2/2017 | Kong et al. | |
| 2017/0094631 A1* | 3/2017 | Pon | H04W 64/00 |

\* cited by examiner

SYSTEMS AND METHODS FOR INDOOR POSITIONING USING WIRELESS POSITIONING NODES

CROSS REFERENCE TO RELATED APPLICATIONS

This application is a continuation of U.S. Nonprovisional application Ser. No. 15/924,093, now patent Ser. No. 10/015,769, entitled "SYSTEMS AND METHODS FOR INDOOR POSITIONING USING WIRELESS POSITIONING NODES," which claims priority to U.S. Provisional Application, 62/472,412, filed Mar. 16, 2017, entitled "INDOOR POSITION LOCATION USING UNSYNCHRONIZED BEACONS," U.S. Provisional Application, 62/532,279, filed Jul. 13, 2017, entitled "INDOOR POSITIONING USING WIRELESS SYNCHRONIZED POSITIONING NODES WITHIN LIGHT BULBS," and U.S. Provisional Application, 62/561,097, filed Sep. 20, 2017, entitled "INDOOR POSITIONING USING WIRELESS SYNCHRONIZED POSITIONING NODES WITHIN SMOKE DETECTORS, ALARM SENSORS, LIGHT TUBES AND BALLASTS," the contents of which are hereby incorporated by reference in their entirety.

BACKGROUND

Technological Field

This disclosure relates to systems and methods for indoor positioning for wireless mobile devices. More particularly, the disclosure relates to using one or more positioning nodes (PONs) to establish a three dimensional position for the wireless mobile device.

Related Art

Indoor position location has become increasingly important in today's mobile wireless environment. Applications for indoor position location can include retail, advertising, commercial, and residential environments. Currently, among the many available possible indoor position solutions, a solution based on using low power beacons that employs Bluetooth standard has emerged as a popular solution to provide indoor proximity estimates to mobile devices. A mobile device detecting the transmission of a specific beacon can determine that it is within close proximity of that beacon's position relying on estimates of transmitted and received signal strength. However, such beacon technology only provides proximity information rather than to determine a three dimensional (e.g., x, y, z) location within an indoor space.

Some beacon-based (e.g., Bluetooth) solutions may rely on estimates of Received Signal Strength Indicators (RSSI) to estimate distance between the mobile device and the beacon. The transmitted signal out of the beacon is of known power and the received signal strength at the mobile receiver is measured. Employing a model of path loss, the system attempts to estimate the distance between the mobile device and the beacon. However, RSSI of RF signals can significantly vary depending on changing environment and especially as the distance between the mobile device and the beacon becomes large. Increased accuracy can require numerous low-power beacons, complicating installation for a given room/space. On the other hand, to increase range, beacon output power is increased leading to lower accuracy and shorter battery life. In addition, increased power levels can also lead to room or floor ambiguity, adversely affecting the utility of the installed beacon(s). Furthermore, even if distance is accurately determined, a single beacon provides no directional information for the detecting mobile, and therefore no physical location.

For some applications, knowing precise position rather than just proximity is crucial. For example, applications where robots or drones are roaming inside a building. If a beacon according to this disclosure is placed in the indoor space and if each robot or drone contains the circuitry to determine its accurate position according to this disclosure, this will lead to much better navigation indoors.

SUMMARY

In general, this disclosure describes systems and methods related to using one or more PONs to provide a three dimensional position for one or more mobile devices within an indoor environment. The PONs can have one or more antennas or emitters. In one embodiment a PON can have multiple, collocated antennas. In other embodiments, the PONs can each have a single antenna. Signals emitted from a single PON having four or more antennas can provide three dimensional positioning for the one or more mobile devices. Multiple PONs having fewer than four antennas can also be used to provide the same three dimensional positioning for the one or more mobile devices. For example, the PONs can be implemented as light bulbs, smoke detectors, alarm modules, motion detectors, light tubes, tube ballasts, and various in-home or smart home electronic devices. The PONs can be ubiquitously deployed within most indoor spaces. The PONs may be connected to main power lines or supply power via wiring to control unit or battery.

The system disclosed herein can include certain wireless circuitry within the PONs configured to emit and/or receive a radiofrequency (RF) ranging signal. The PONs could be standalone or collocated within other stationary devices (e.g., smart light bulbs, smoke detectors, and alarm modules). A mobile device (e.g., a smartphone, wireless-enabled tablet, or similar) within the vicinity of one or more PONs can receive the emitted ranging signals. The mobile device can communicate with an internet accessible server that provides relevant aiding information allowing the mobile device to determine its indoor location with high accuracy based on this aiding information along with the timing of the ranging signals receives. Such server-provided aiding information can include, but is not limited to, the physical location of each PON in the vicinity to aid in position calculation, as well as their code offset and frequency to aid in detecting their emitted signal and identifying the sending PON for each signal.

The systems, methods and devices of this disclosure each have several innovative aspects, no single one of which is solely responsible for the desirable attributes disclosed herein.

One aspect of the disclosure provides a system for determining a location of a mobile device within an indoor environment. The system can have a first positioning node (PON). The first PON can have one or more antennas and disposed in a first location in the indoor environment and configured to transmit a first modulated signal via a first antenna. The system can have a second PON having one or more antennas disposed in a second location in the indoor environment different from the first location and configured to transmit a second modulated signal via a second antenna. The second modulated signal can be synchronized in time and frequency with the first modulated signal at a time of transmission. The system can have a server. The server can receive a request from the mobile device, the request indicating a coarse location of the mobile device, the coarse location being related to a location of the indoor environment. The server can transmit aiding information related to first PON and the second PON based on the request to the mobile device, the aiding information including location information for the first PON and the second PON, and signal information related to the first modulated signal and the second modulated signal. The server can receive a position report from the mobile device, the position report being based on a difference in phase between the first modulated signal and the second modulated signal at a time of arrival at the mobile device.

Another aspect of the disclosure provides a method for determining a location of a mobile device within an indoor environment. The method can include transmitting, by a first positioning node (PON), a first modulated signal via a first antenna, the first PON having one or more antennas and disposed in a first location in the indoor environment. The method can include transmitting, by a second PON, a second modulated signal via a second antenna, the second PON having one or more antennas and disposed in a second location in the indoor environment different from the first location, the second modulated signal being synchronized in time and frequency with the first modulated signal at a time of transmission. The method can include receiving, at a server, a request from the mobile device indicating a coarse location of the mobile device, the coarse location being related to a location of the indoor environment. The method can include transmitting, by the server, aiding information related to first PON and the second PON, based on the request to the mobile device, the aiding information including location information for the first PON and the second PON, and signal information related to the first modulated signal and the second modulated signal. The method can include receiving, at the server, a position report from the mobile device, the position report being based on a difference in phase between the first modulated signal and the second modulated signal at a time of arrival at the mobile device.

Another aspect of the disclosure provides a method for operating a mobile device to determine the location of the mobile device within an indoor environment. The indoor environment can have one or more positioning nodes (PONs), each PON having one or more antennas. The method can include determining, at a mobile device, a coarse location of the indoor environment. The method can include transmitting a request to a server including the coarse location, the server storing aiding information related to the one or more PONs. The method can include receiving, at the mobile device, the aiding information from the server based on the coarse location. The method can include receiving a first positioning signal from a first antenna of the one or more antennas. The method can include receiving a second positioning signal from a second antenna of the one or more antennas, the second positioning being out of phase with the first positioning signal. The method can include receiving a third positioning signal from a third antenna of the one or more antennas, the third positioning signal being out of phase with the first positioning signal and the second positioning signal. The method can include determining a position mobile device based on a one-way time-difference of arrival (TDOA) between the first positioning signal, the second positioning signal, and the third positioning signal.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Figure 1:
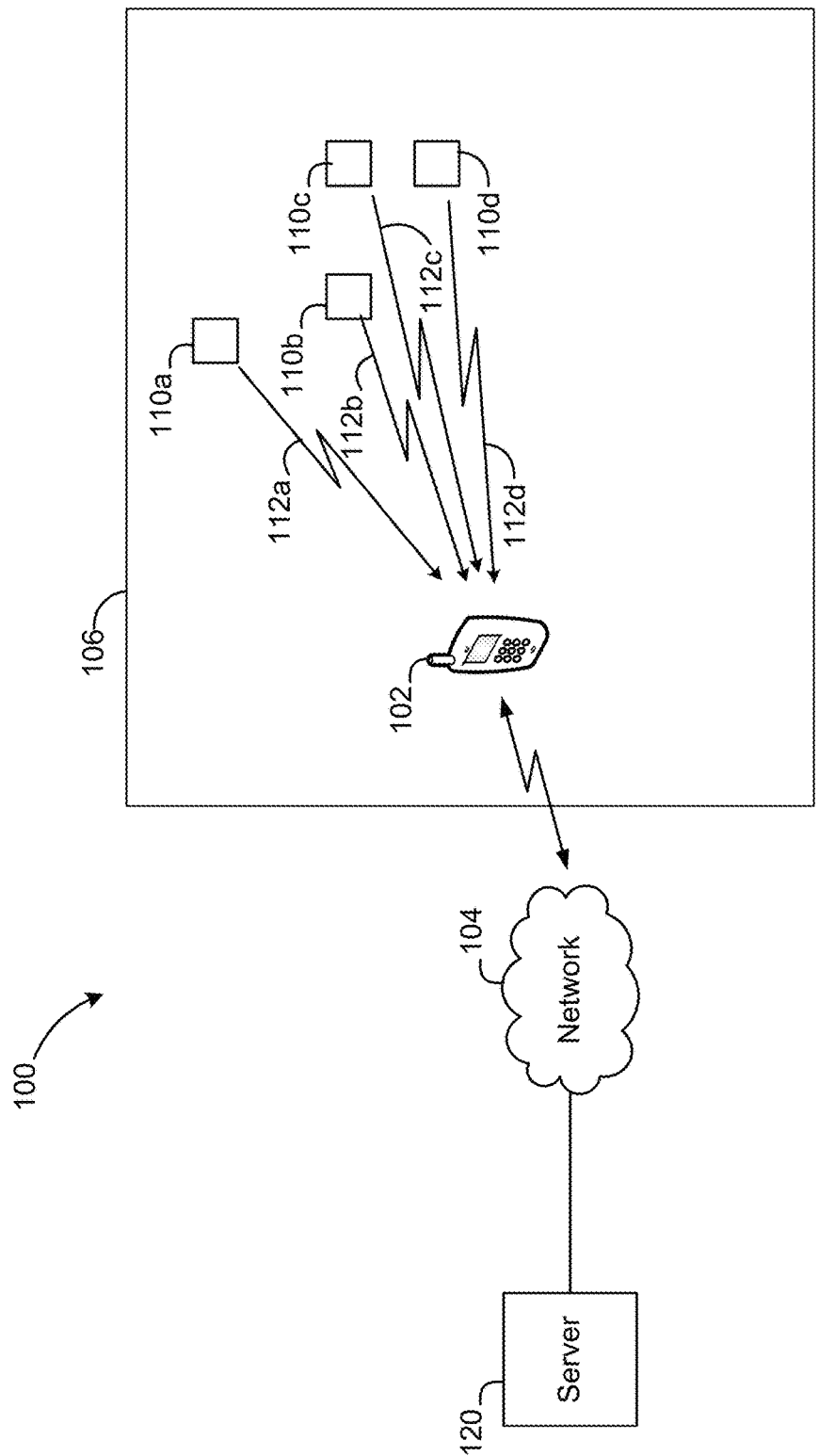
FIG. 1 is a graphical depiction of an embodiment of an indoor positioning system for a mobile device.

FIG. 1 is a graphical depiction of an embodiment of an indoor positioning system for a mobile device. An indoor positioning system (system) 100 can have a mobile device 102. The mobile device 102 can be a smart phone or other mobile electronic device including software and/or hardware as disclosed herein. The mobile device 102 can be communicatively coupled to a server 120 via a wide area network (WAN) or network 104. The network 104 can be, for example, the Internet or other applicable wireless network. The system 100 can be associated with or move in and out of an indoor environment 106. The system 100 can have one or more positioning nodes (PONs) 110 located within the indoor environment 106 with the mobile device 102. The PONs 110 may also be referred to herein simply as beacons or nodes. The PONs 110 are labeled as PON 110a, PON 110b, PON 110c, and PON 110d, but may referred to collectively as PONs 110. Each PON 110 can transmit one or more signals 112 (shown as a signal 112a, a signal 112b, a signal 112c, a signal 112D) that the mobile device 102 can use to determine a three-dimensional position within the indoor environment 106. The signals 112 are continuously or periodically transmitted, as required. For ease of description, the PONs 110 are depicted as each transmitting a single signal 112. However as described in the following, each of the PONs 110 may have one or more antennas, where each antenna can transmit a respective version of the signal 112.

Thus each PON 110 can actually transmit one or more signals 112 as needed according to the following embodiments.

As the mobile device 102 moves indoors, it may not have sufficient signal to provide precise positioning via, for example, a global positioning system (GPS) signal. The mobile device 102 may initially determine an approximate or general physical position of the indoor environment 106 based on a coarse location via a last known outdoor location, via GPS location of the mobile device 102, for example. In some other examples, the mobile device 102 can determine a coarse location based on Wi-Fi signals from one or more networks in the local area or even within the indoor environment 106. In addition, while a Wi-Fi signal may provide general location, that is, somewhere inside a given building, such location information is still "coarse" in terms of the indoor positioning system disclosed herein. In some embodiments, the signals 112 transmitted by the PONs 110 can also include an indication of approximate position of the indoor environment 106. In some embodiments, the coarse position may be of the size of the local vicinity spanning one or more rooms within an identified building and is used by the server 120 to provide the appropriate aiding information.

The mobile device 102 can determine its coarse location, for example, in which building or which part of a building, within several rooms. The mobile device 102 can accomplish this determination using last known GPS, Wi-Fi or having received the signal 112 from at least one PON 110. This coarse location information can then be sent to the server 120. The server 120 can then provide the aiding information including the location of each close PON 110 and their identifying signal characteristics so the mobile device 102 can detect them and can attribute each received signal 112 to the corresponding PON 110. The mobile device 102 can use this information to look for all the PONs 110 within the indoor environment 106. Using the location of each PON 110, the mobile device 102 can determine its three dimensional location, using four signals 112, for example. In some embodiments, the mobile device 102 can use three signals 112 to determine a two dimensional position within the indoor environment 106. Similarly, with only two signals 112, the mobile device 102 can determine a one dimensional position. The mobile device 102 can then optionally report the computed position back to the server 120.

Having determined an approximate or coarse location, the mobile device 102 can communicate with a server 120 via the network 104. The server 120 can then transmit information related to the location of each of the PONs 110. Such information can include the locations and signal characteristics of all the PONs 110 within the indoor environment 106. Using this information, the mobile device 102 can then detect and process the signals (e.g., the signals 112) received from the PONs 110 to determine its three-dimensional position within the indoor environment 106. The mobile device 102 can then optionally report the computer location to the server 120 to aid in continued calibration and accuracy improvement of the PONs 110.

As described in the following, certain embodiments of the PON 110 can be a single, stand-alone device having one or multiple antennas. In some embodiments, the PONs 110 can be co-located with various smart devices, Internet of things (IOT) devices, and other common household systems. The PONs 110 may continuously or periodically transmit and receive multi-tiered ranging signals from within smoke detectors, alarm modules, light bulbs, ballasts and other IoT or smart appliances or fixtures. In some ranging systems, higher positioning resolution may require more complex and higher power consuming utilized circuitry. In some embodiments, the system 100, the PONs 110 more specifically, can transmit a multi-tiered ranging signal that can accommodate applications with various desired levels of accuracy. In applications not requiring the highest possible accuracy are able to determine their location at their lower required accuracy using less complex circuits and less power. Smoke detectors, alarm sensors, light bulbs/tubes, ballasts, IoT devices, smart appliances, and the like may be referred to herein as containing devices (CDs). CDs are generally any device that can contain the PONs 110. In some embodiments CDs like a smoke detector or lightbulb may have confined or limited space constraints. Accordingly, such devices may only accommodate a single or at least a limited number of antennas. In some other embodiments the PONs 110 can also be standalone positioning devices (e.g., not within a CD) having more than one antenna and in some cases four or more antennas.

An advantage of co-locating PONs 110 within smoke detectors, alarm sensors, light tubes, or other common household devices is their common presence in most indoor locations and generally simple, one-for-one replacement. In addition, they may already have a constant continuous power source that can be used for co-located PONs 110.

In some embodiments, the PONs 110 co-located with an existing household device or CD can also take advantage of preexisting wiring or electrical/electronic backbone within the indoor environment 106. Such pre-existing wiring can provide a constant continuous source of power in addition to a time or frequency reference. The common time or frequency reference can be important for synchronizing the timing and frequencies of the PONs 110 within the same vicinity, as described in more detail below.

These CDs may already perform various electronic operations. Accordingly, the additional silicon area required added positioning beacon/PON capability may not dramatically increase the cost of manufacturing. In addition, the PON 110 can leverage much of the common circuit circuitry already existing within the CD.

In some other embodiments, the PONs 110 can be hardwired to a continuous power source within the indoor environment 106 or can have an independent power supply such as a battery. Such PONs 110 can be a standalone device. As described below, some embodiments of the PONs 110 can have four or more antennas. A single PON 110 having four or more antennas can independently provide a 3D position to the mobile device 102.

In some embodiments, the system 100 can allow unlimited simultaneous users. That is, any number of mobile devices 102 can be present within the indoor environment 106 and use the PONs 110 to determine three-dimensional positions within the indoor environment 106.

The mobile device 102 can use a known position of the PONs 110 (e.g., from the server 120) in addition to time and distance traveled by the signals 112 to determine its own position. In a one-way time of arrival (OW-TOA) positioning scheme, the clocks of all PONs 110 (in the indoor environment 106) and the mobile device 102 must be precisely synchronized. While Synchronization among the PONs 110 within the indoor environment 106 is feasible, as described below, requiring synchronization between the PONs and any and all mobile devices entering the environment may not be feasible. Therefore, a variant of the OW-TOA is one-way time difference of arrival (OW-TDOA), in which the clocks of the PONs 110 are synchronized among each other but clock synchronization with the mobile device 102 is not required. In OW-TDOA, the clock of the mobile device 102 may not be synchronized with the PONs 110. The clock of the mobile device 102 can have an offset relative to the synchronized clocks of the PONs 110. OW-TDOA handles this unknown or random time offset of the mobile device 102 by requiring one more antenna measurements over what OW-TOA would require but eliminates the need for the mobile devices to be synchronized with the PONs 110 in the indoor environment 106.

In some examples, an OW-TDOA methodology can eliminate certain multiuser restrictions caused by long processing or communication delays if a Two-Way ranging system was used. In OW-TDOA, ranging nodes (e.g., the PONs 110) can continuously transmit the signals 112 that the mobile devices 102 can use to determine a three-dimensional position. In some embodiments the mobile device 102 may not transmit ranging signals back to, or directly synchronize with the PONs 110. Accordingly, all of the PONs 110 can have a common or synchronized clock. This synchronization is relatively simple in a single PON 110 having multiple (e.g., four or more antennas). Four signals 112 being transmitted from antennas in a single PON 110 can readily have a common timing source (e.g., an internal local oscillator). In the PONs 110 having only one, two, or three antennas, or the PONs 110 distributed among different devices (e.g., CDs), other synchronization methods may be required. For example, the PONs 110 implemented in four distinct and separate light bulbs distributed within the indoor environment 106 may all receive power from a common source such as a main power network within a building. Thus, in at least one example, the PONs 110 can use the frequency of such power source as their synchronization signal.

Figure 2:
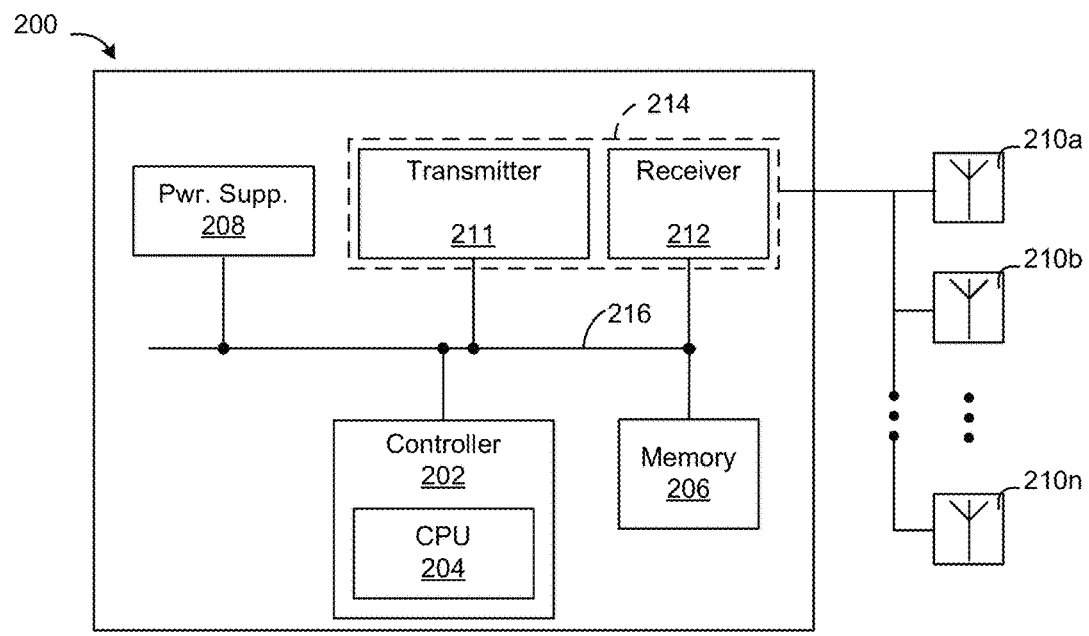
FIG. 2 is a functional block diagram of an embodiment of the positioning node of FIG. 1.

FIG. 2 is a functional block diagram of an embodiment of the positioning node of FIG. 1. In some embodiments, a PON 200 can be similar to the PONs 110. The PON 200 can have a controller 202. The controller 202 can control the overall functions of the PON 200. For example, the controller 202 can control the transmission of the signals 112 from the antennas 210. The controller 202 can have a central processing unit (CPU) 204. The CPU 204 also be implemented as one or more processors or microprocessors. The CPU 204 can have at least one reference oscillator or clock to maintain timing synchronization for the PON 200. The reference oscillator can have, for example a local oscillator (LO) used to synchronize the PON 200 with one or more other PONs (e.g., PON 110).

The controller 202 can also include a modem (not shown) or be communicatively coupled to a modem of the CD, for example. For ease of description, the performance of certain functions may be described herein in terms of the PON 200 however, the CPU 204 or the controller 202 may actually perform such functions.

The PON 200 can have a memory 206. The memory 206 can store information related to other PONs 110, 200 in addition to instructions or code for the performance of various tasks associated with indoor positioning for the mobile device 102. The memory 206 can receive and store data and other information related to the signals 112 and their respective synchronization with the signals 112 from the other PONs 110.

The PON 200 can also have a power supply 208. The power supply 208 can have one or more power storage components, such as battery. Such battery can be rechargeable or user replaceable. In some embodiments, the power supply 208 can be a hardware power supply such as main power supply in a building. In such a case, the power supply 208 can be for example, 110 V, 120V, and 50 or 60 cycle power, for example. Other configurations are also possible as described below.

The PON 200 can have one or more antennas 210. The PON 200 is shown with three antennas 210a, 210b, 210n, but can have a single antenna 210. The PON 200 can also have two, three, four or more antennas 210 as indicated by the ellipsis in FIG. 2.

The PON 200 can have at least one transmitter 211. The transmitter 211 can be coupled to one or more antennas 210 to transmit the signal 112 for example. The PON 200 can also have a receiver 212 configured to receive signals or various types of communication via the antennas 210 (e.g., the antenna 210a for example). In some embodiments, each of the antennas 210 can have a corresponding transmitter 211 (e.g., multiple transmitters 211 per PON 200). In embodiments in which the PON 200 has multiple antennas 210, each of the antennas 210 may be driven by its own transmitter 211. In such embodiments, only one of the antennas 210 may be coupled to the receiver 212. In some embodiments the PON 200 may not have the receiver 212 as the PON 200 may be implemented only for transmitting the signals 112.

In some embodiments the transmitter 211 in the receiver 212 can be combined in a transceiver 214. The transceiver 214 can combine the functions of the transmitter 211 and receiver 212 in order to couple upon to one or more communication networks via the antennas 210. The transceiver 214 can also implement various RF front end components and capabilities. The RF front end can include for example, one or more filters, amplifiers e.g., power amplifier or low noise amplifier), mixers, and LOs. The transceiver 214 can further couple the PON 200 to the (wireless) network 120 via the antenna(s) 210.

The PON 200 can also have a communications bus 216. The communications bus 216 can communicatively couple the above described components of the PON 200.

In one embodiment, the PON 200 can simply have the transmitter 211 and a single antenna 210, as opposed to the transceiver 214 and multiple antennas 210. In the single antenna configuration, the PON 200 can be used in coordination with other PONs 200 (e.g., multiple PONs 110) to provide indoor location capability for the mobile device 102. As described in more detail below, four or more signals 112 may be required to provide three dimensional positioning for the mobile device 102. Accordingly, four single antenna PONs 200 may be required to provide such location determination for the mobile device 102.

Figure 3:
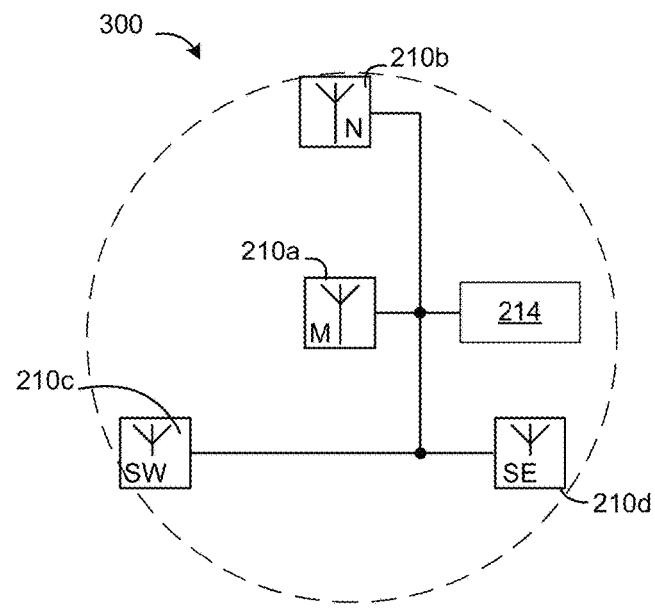
FIG. 3 is a graphical depiction of an embodiment of an arrangement of the antennas of the PON of FIG. 2.

In a multi-antenna configuration, each PON 200 can each have four or more antennas. The antennas 210 can be geometrically arranged and each transmit distinguishable signals 112 that are received at the mobile device 102 (FIG. 3). The signals transmitted from the antennas 210 shown can be different but internally synchronized signals. That is, the signals a synchronized in time, phase, and frequency. In some examples, the antennas 210 may not be physically arranged in a linear manner (FIG. 3).

In some embodiments, the PON 200 can also have two or three antennas 210. In such an embodiment, multiple PONs 200 may be required in order to provide the four signals 112 to the mobile device 102.

The PON 200 can implement one of multiple radio access technologies. For example, direct sequence spread spectrum (DSSS) can be used for the signals 112. By examining the received carrier phase relationships among the distinguishable received signals (e.g., signals 112) the mobile device 102 can determine its three-dimensional location relative to the detected (multi-antenna) PON 200. In DSSS, each of the signals 112 is distinguished from other signals using different code offsets. The PON 200, or group of PONs 200, emitting more than three signals 112 or additional beacons within the indoor environment 106 can provide redundancy to the solution and increase accuracy. In some example, the more signals 112 that the mobile device 102 receives, the more accurate the three dimensional position determination becomes.

FIG. 3 is a graphical depiction of an embodiment of an arrangement of the antennas of the positioning node of FIG. 2. In an embodiment, the PON 200 can have a cluster 300 of four antennas 210a, 210b, 210c, 210d, placing the (main) antenna 210a at the center of the cluster. In some embodiments, the other three (additional) antennas 210b, 210c, 210d, can be placed along the circumference of the circle (shown in dashed lines) centered on the antenna 210. For ease of description, only a single transceiver 214 is shown in FIG. 3. However, similar to above, each of the antennas 210 of the cluster 300 may be coupled to an individual or its own transmitter 211 (e.g., transceiver 214).

Locations of the additional antennas 210 may be chosen such that no three antennas, including the antenna 210a, lie the same line. That is, they may not be arranged in a linear manner. The antenna 210a has been labeled with M (e.g., for 'main'), the antenna 211 is labeled with an N, the antenna 212 is labeled with SW, and antenna 213 is labeled with SW. The N, SW, SE are exemplary directional labels, corresponding respectively to North, Southwest, and Southeast. A linear arrangement of two or more of the antennas 210a, 210b, 210c, 210d is possible (e.g., FIG. 4), however the precision of the indoor position provided to the mobile device 102 may be reduced.

In an embodiment, the PON 200 can emit a DSSS Bi-Phase Shift Keyed (BPSK) modulated RF signal (e.g., the signal 112) via the antenna 210a. This may be referred to as the main signal. The PON 200 can also emit, or transmit, delayed copies of this DSSS main signal from the other antennas N, SW and SE. For example, the signals radiating from N, SW, and SE can be copies of the (main) signal 112 from the antenna 210a (M) delayed by time delays d-N, d-SW and d_SE, respectively where "d" indicates a period of the delay. A DSSS signal delayed by more than one spreading chip is distinguishable at the receiver (e.g., the mobile device 102) from the main signal. Hence if d_N, d_SW and d_SE are all greater than one spreading chip period from the main signal 112 from the antenna 210a, and are more than one spreading chip period apart from each other, the mobile device 102 can distinguish among the various received signals 112 from the PON 200. As used herein, a chip is a pulse of a direct-sequence spread spectrum (DSSS) code, such as a Pseudorandom Noise (PN) code sequence used in direct-sequence code division multiple access (CDMA) channel access technique.

Assuming the delays d_N, d_SW and d_SE are known and their respective antennas are stationary, mobile device 102 can adjust for time difference as if they were all transmitted from their respective antennas 210b, 210c, 210d at the same instant. After such adjustment by the mobile device 102, the computed time difference of arrival of the various copies of the signal 112 is a function of the difference in free air path delay among the four signals 212. If all of the signals 112 are transmitted from the antennas 210a, 210b, 210c, 210d at the same time, after correcting for the known inserted delays "d", then each signal 112 can arrive at mobile device 102 after their free air path delay. Since the mobile device 102 and the PON 200 are not synchronized to a global time reference, the free air path is not measurable by examining any (single) one of the distinguishable signals 112. However, the mobile device 102 can determine both the angles between the signals 112 and the mobile device 102, as well as the range based on the difference in arrivals of the distinguishable signals 112 from that PON 200.

As noted above, the PON 200 can have can have fewer than four antennas 210. In order to provide sufficient information to the mobile device 102 for three dimensional position determination, the number of signals 112 received at the mobile device 102 may be greater than or equal to four. Thus, in some embodiments, multiple PONs 200 (having fewer than four antennas 210) may be required for three dimensional position determination within the indoor environment 106. This may require, for example, two PONs 200 having two antennas 210 each, four single antenna PONs 200, or other combinations amounting to four or more antennas 210, each transmitting a signal. In the presence of fewer than four signals 112 from an associated fewer than four antennas 210, the mobile device 102 can determine a two dimensional position using three signals 112 or a one dimensional position using two signals 112.

Figure 4:
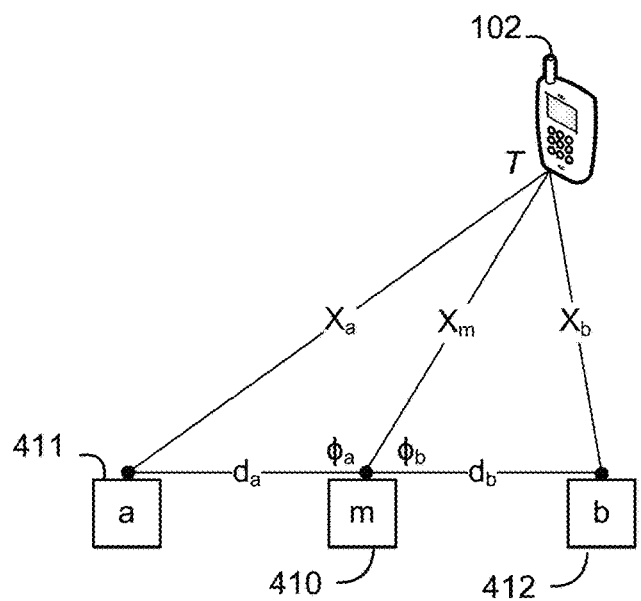
FIG. 4 is a graphical depiction of a method for determining two-dimensional location for the mobile device of FIG. 1.

FIG. 4 is a graphical depiction of a method for determining two-dimensional location for the mobile device of FIG. 1. In the example of FIG. 4, the signals 112 can be received at the mobile device 102 from three antennas 410, 411, 412. The three antennas 410, 411, 412 can be implemented within the same PON 200 or they may be antennas from separate or distributed (or single-antenna) PONs 200 having a signal antenna. For example, three single-antenna PONs 200 can be disposed in a linear arrangement within a containing device, such as a lighting fixture (e.g., a fluorescent light tube), in a linear arrangement. The antennas 410, 411, 412 can also be disposed within a single PON 200.

The antenna (main antenna) 410, denoted by m, and a left antenna 411, denoted by subscript a, and a right antenna 412, denoted by subscript b. In this example, all antennas 410, 411, 412 are co-linear for illustration purposes but they do not need to be in an actual implementation. Indeed, it may be advantageous in certain situations if the antennas are not co-linear. The mobile device 102, is denoted by T (T is for target).

The distances of antennas 411, 412 from the main antenna 410 are $d_a$ and $d_b$ respectively. $X_m$ denotes the distance between the main antenna 410, M, and the mobile device 102, T. Distances $X_a$ and $X_b$ denote the distance from the target mobile, T, to antennas 411, 412 respectively. The angle $\emptyset_a$ is the angle T→m→a, while the angle $\emptyset_b$ is the angle T→m→b. Choosing a, m and b to be co-linear results in $\emptyset_b = 180 - \emptyset_a$ and simplifies the math of this 2D example. From trigonometry, we know that, $$X_a^2 = d_a^2 + X_m^2 - 2d_a X_m \cos \emptyset_a \quad (1)$$

And, $$X_b^2 = d_b^2 + X_m^2 - 2d_b X_m \cos \emptyset_b \quad (2)$$

Let $X_a - X_m = P_a + n_a \lambda$ were $\lambda$ is the carrier wavelength, $n_a$ is an integer and $P_a$ is the fractional wavelength part of the difference. Because both $d_a$ and $d_b$ are in this example assumed to be less than $\lambda$, regardless of where T might be in the plane, $X_a - X_m$ and $X_b - X_m$ will always be less than $\lambda$ and $n_a = 0$. We can therefore write $X_a - X_m = P_a$ and $X_b - X_m = P_b$. Plugging into (1) and (2) and simplifying, $$P_a^2 - d_a^2 = -2X_m(P_a - 2d_a \cos \emptyset_a) \quad (3)$$

$$P_b^2 - d_b^2 = -2X_m(P_b - 2d_b \cos \emptyset_b) \quad (4)$$

Given that $\emptyset_b = 180 - \emptyset_a$, hence $\cos \emptyset_a = -\cos \emptyset_b$. Solving for $X_m$, $$X_m = \frac{(P_a^2 - d_a^2) + (P_b^2 - d_b^2)}{-2(P_a + P_b)} \quad (5)$$

then use $X_m$ and (1) or (2) to solve for $\emptyset_a$.

The range $X_m$ from the main radiator to T and the angle $\emptyset_a$ can be solved knowing the carrier phase differences $P_a$ and $P_b$. The location of the point T can then be computed bas on the known positions of m (as it is determined during installation) and the orientation of the line a→m→b in the 2D plane. We now relax the assumption that both $d_a$ and $d_b$ are less than λ hence $n_a$. may not be assumed to always equal zero. This means that measured $P_a$ would be ambiguous by an integer number of carrier cycles. This is known in the field of outdoor positioning as the carrier integer ambiguity and numerous techniques that are well known in the art are available to mitigate its effects.

Figure 5:
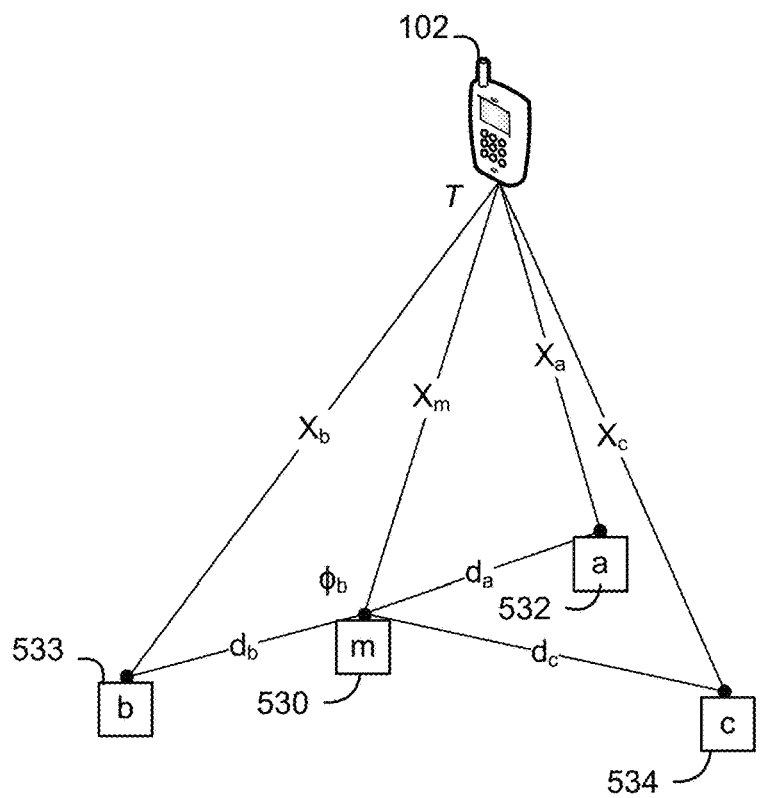
FIG. 5 is a graphical depiction of a method for determining three-dimensional location for the mobile device of FIG. 1.

FIG. 5 is a graphical depiction of a method for determining three-dimensional location for the mobile device of FIG. 1. The arrangement of FIG. 4 can be generalized to the 3D case as shown in FIG. 5. The 3D case shown corresponds to the arrangement of four single antenna PONs (e.g., the PON 200 having one antenna 210). For the 3D general case four other, delayed antennas around the main antenna m 530. The minimum required set for the 3D case is three antennas, or emitters, in addition to the center main antenna m. The additional three antennas are labeled antenna a, 532, antenna b 533, and antenna c 534. The distance between the antennas a, b, c and the main antenna 530 m are, respectively, distances $d_a$, $d_b$ and $d_c$ as shown. The location of each antenna may be identified by the unit vector anchored at the main antenna 530 and by the distance of the respective antenna 532, 533, 534 from m. For example, the antenna a 532 is located along the unit vector $\vec{a} = a_x\hat{i} + a_y\hat{j} + a_z\hat{k}$ and is $d_a$ away from m. The example above, $a_z$, $b_z$ and $c_z$ are zero for the two-dimensional case where all the antennas lie in a plane. However the antennas need not be co-planar. In some examples, it may be more advantageous if the antennas are not arranged in a co-planar manner because to eliminate a symmetric solution located behind the planar beacon. The radiating antennas may be of the type that has a conducting reflecting plane and hence radiate only towards the front of the beacon (e.g., the PON 110) with minimal radiation toward the back of the beacon.

As in the 2D case, the distance from antennas 530, 532, 533, 534 to the mobile device 102 at T are $X_a$, $X_b$, $X_c$ and $X_m$. The term $\hat{V}$ is defined as the unit vector anchored at m and pointing to the target T (e.g., the mobile device 102).

$$\hat{V} = V_x \hat{i} + V_y \hat{j} + V_z \hat{k}$$

Calculating $\hat{V}$ and $X_m$, provides the 3D coordinates of the mobile device 102 at point T (target). From FIG. 5, $\emptyset_b$ is the angle that the range line Xm forms with the vector $\vec{b}$ that defines the location of the antenna b 533. Similarly, for antenna a 532 and antenna c 534. Trigonometry provides, $$(\hat{V} \cdot \vec{a})/|\vec{a}| = \cos \emptyset_a$$

and $$|\vec{a}| = 1$$

then $$V_x a_x + V_y a_y = \cos \emptyset_a \quad (6)$$

$$V_x b_x + V_y b_y = \cos \emptyset_b \quad (7)$$

$$V_x c_x + V_y c_y = \cos \emptyset_c \quad (8)$$

The terms $a_z$, $b_z$, and $c_z$ are zero in this example. Additionally, $\emptyset_a$, $\emptyset_b$ and $\emptyset_c$ are not independent variables since any two angles fully define the third. In fact, $$\cos \emptyset_c = CC_a \cos \emptyset_a + CC_b \cos \emptyset_b \quad (9)$$

where, $$CC_a = \frac{c_x b_y - c_y b_x}{a_x b_y - a_y b_x} \text{ and, } CC_b = \frac{c_y a_x - c_x a_y}{a_x b_y - a_y b_x}$$

Similar to the 2D example above, in 3D $$P_a^2 - d_a^2 = -2X_m(P_a - d_a \cos \emptyset_a) \quad (10)$$

$$P_b^2 - d_b^2 = -2X_m(P_b - d_b \cos \emptyset_b) \quad (11)$$

$$P_c^2 - d_c^2 = -2X_m(P_c - d_c \cos \emptyset_c) \quad (12)$$

Solving for $X_m$, $$X_m = \frac{(P_c^2 - d_c^2) - CA(P_a^2 - d_a^2) - CB(P_b^2 - d_b^2)}{(-2)(P_c - CAP_a - CBP_b)} \quad (13)$$

where $$CA = \frac{(d_c CC_a)}{d_a}, \text{ and } CB = \frac{(d_c CC_b)}{d_b}$$

Using $X_m$ and equations (10), (11), can allow a determination of $\emptyset_a$ and $\emptyset_b$.

From combining equations (6), (7) and (8) we know that, $$V_x = \frac{b_y \cos \emptyset_a - a_y \cos \emptyset_b}{a_x b_y - a_y b_x} \quad (14)$$

$$V_y = \frac{a_x \cos \emptyset_b - b_x \cos \emptyset_a}{a_x b_y - a_y b_x} \quad (15)$$

and $\hat{V}$ being a unit vector, $$V_z = \sqrt{1 - V_x^2 - V_y^2}$$

This provides $X_m$, $V_x$, $V_y$ and $V_z$. The location of the target T is $(T_x, T_y, T_z)$ is then, $$T_x = X_m V_x, T_y = X_m V_y, \text{ and } T_z = X_m V_z$$

In cases where solving the angles without computing $X_m$ is desirable, that is, when two antennas are used, we can eliminate $X_m$ by combining the equations and calculate $\emptyset_a$, $\emptyset_b$ and $\emptyset_c$ directly without $X_m$. This is useful because $X_m$ is sensitive to noise due to the relative proximity of the antennas. However calculation of $\emptyset_a$, $\emptyset_b$ and $\emptyset_c$ are not as sensitive. The above 2D and 3D solution examples were provided as one implementation of resolving a 3D position using four measurements, in the 3D case. We want to emphasize that these are only examples of computations that could be performed to yield the location. They are by no means the only way to arrive at a location.

In some examples, the PONs 110 (or the PON 200) can be placed in one or more accessible locations within the indoor environment 106. This can be at one or more points on the ceiling or high on one or more walls to provide an unobstructed path between the PONs 110 and mobile device 102 in the indoor environment 106. The mobile device 102 can receive the signals 112 and compute the distance and azimuth to the antennas and the PON(s) 110. The mobile device 102 can then compute its 3D orientation based on the positions of the PONs 110. In some embodiments, this information can further be uploaded to the server 120 to be used by other mobile device 102 entering the indoor environment 106 in the future. When mobile device 102 enters the room (e.g., the indoor environment 106), it can detect an identifying signal from the PON 110.

In another example, the mobile device 102 can have a camera. The camera can take several photos of the indoor environment 106 such that the resulting photos overlap in coverage. Each time a photo is snapped, the mobile device 102 can perform a location determination based on the signals 112 from the PON 110 and record the result. The overlapping photos of the room can be used to construct a 3D model of the indoor environment 106. In addition, because the mobile device 102 performs a location measurement with every photo, the mobile device 102 can also accurately determine the location and orientation of the PON 110 and its relationship to the 3D model of the interior of the indoor environment 106. This method constructs a 3D model of the room and locates the PON(s) 110. This 3D map is very valuable to applications needing to take advantage of this new localization ability. Also, the x, y, z location of the mobile device 102 may then be available within a useful context of the 3D model of the room including obstacles, furniture, appliances, points of interest, etc.

Figure 6:
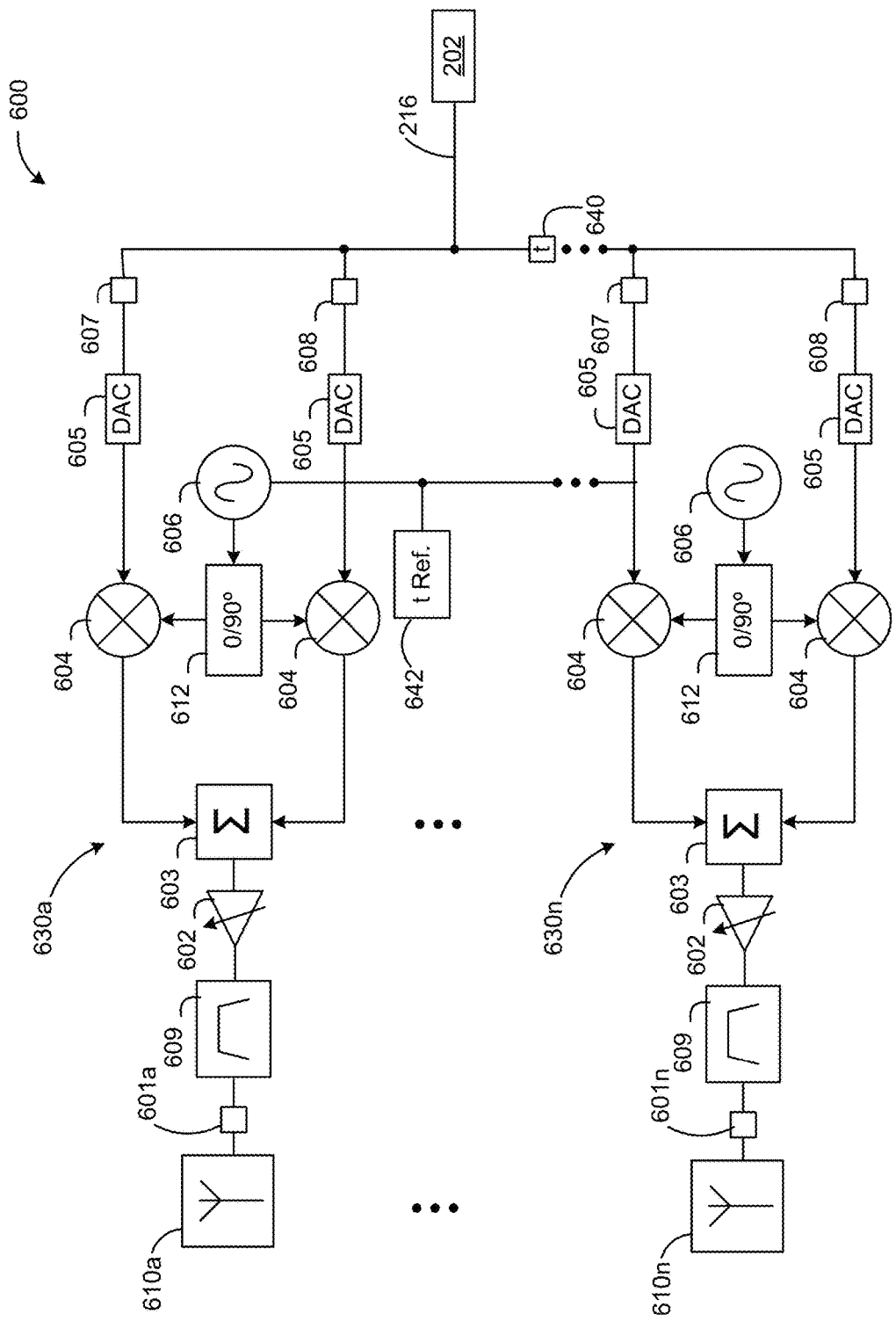
FIG. 6 is a functional block diagram of an embodiment of a radiofrequency front end of the positioning node of FIG. 2.

FIG. 6 is a functional block diagram of an embodiment of a radiofrequency front end of the positioning node of FIG. 2. The PON 200 can have an RF front end 600. The RF front end 600 can be coupled to the controller 202 (FIG. 2) for example. The RF front end 600 can have many of the same features or components and perform the same or similar tasks as the transceiver 214, for example.

In some embodiments, the RF front end 600 can be used to periodically transmit the signal 112. As described above, certain embodiments may not require a receive chain because the PON 200 may not be required to necessarily receive external signals. Thus at a minimum the RF front end 600 has at least one RF transmit chain 630 driving each antenna 610. Multiple RF transmit chains 630 are shown for ease of description, however the PON 200 may only have one antenna 210 and thus a single transmit chain 630 driving one antenna 610. As described below however, there may also be certain advantages to having a receive chain.

The controller 202 can be coupled to one or more antennas 610 (shown as antennas 610a-610n) via the RF front end 600. The RF front end 600 can have one or more RF upconversion, or transmit chains 630. The ellipses in FIG. 6 indicate the use of multiple antennas 610a-610n in the RF front end 600. For ease of description, the elements of the transmit chain 630a are the primary example of the following description, however the features and characteristics are equally applicable to additional transmit chains 630 as needed for multi-antenna implementations.

Lowpass filtered digital data from the baseband and application processors (e.g., the CPU 204) can be received at an in-phase and quadrature-phase (I & Q) ports 607, 608. A digital to analog converters (DAC) 605 can convert the digital samples stream to continuous-time analog signal. The I and Q analog signals can be provided to quadrature upconverter having I and Q mixers 604 and a 90-degree phase shifter 612. Each transmit chain can have a local oscillator (LO) 606 that generates a continuous sinusoid at the carrier frequency. The LO 606 can be coupled to a time reference 642. The time reference 642 can be used to control the oscillation of all of the LOs 606 of each transmit chain 630. Alternatively, there may be one time reference 642 controlling one LO 606 and the output of such LO 606 can be shared among all of the transmit chains 630. The time reference can ensure that all transmit chains 630 are synchronized. In some embodiments having only a single transmit chain 630, the RF front end 600 can implement other types of synchronization as described below.

The output of the LO 606 can be split into in-phase (I) and quadrature (Q) phase components and fed into the mixers 304. The output of the mixers 604 can be combined using combiner 603, and then passes through a power amplifier (PA) 602. The output of the PA 602 can flow through a bandpass filter 609 to reduce out-of-band emissions. An additional filter (not shown) performing a similar function to the bandpass filter 609 can also be placed between the combiner 603 and the power amplifier 602. The transmit RF signal is then available at the (RF) output port 601a for transmission via an antenna 610a. This process can form the main RF signal transmitted via the RF front end 600.

In embodiments in which the RF front end 600 is coupled to multiple antennas 610, multiple transmit chains 630 may be present and coupled to the associated antennas 610n. The additional signal(s) 112 transmitted via the antennas 610n can be delayed from the main signal 112 transmitted by the antenna 610a. The delay can be incorporated into the corresponding signals 112 via analog or digital circuitry. In some embodiments certain hardware can include a time delay 640 for each delayed signal copy, each transmitter to its own radiating antenna 610n. The original digital data stream feeding I and Q input ports 607 and 608 (e.g., from the CPU 620) can be copied into multiple streams with each stream delayed from the others by the required amount. This can be accomplished by inserting a digital shift registers (e.g., the time delay 640) into the respective digital transmit chains 630 to achieve the required amount of delay for each transmit stream. In some embodiments, such a digital shift, or time delay, can be the minimum delay required for the receiver to distinguish among the distinct signals 112. In case of PN sequence BPSK or QPSK (quadrature phase shift keying) driven DSSS modulation, each signal 112 can differ in delay from all other signals 112 by at least one PN sequence clock period. This difference can be a separation of one chip period, for example. Some applications may require a separation of more than one chip period to provide guard time.

Figure 7:
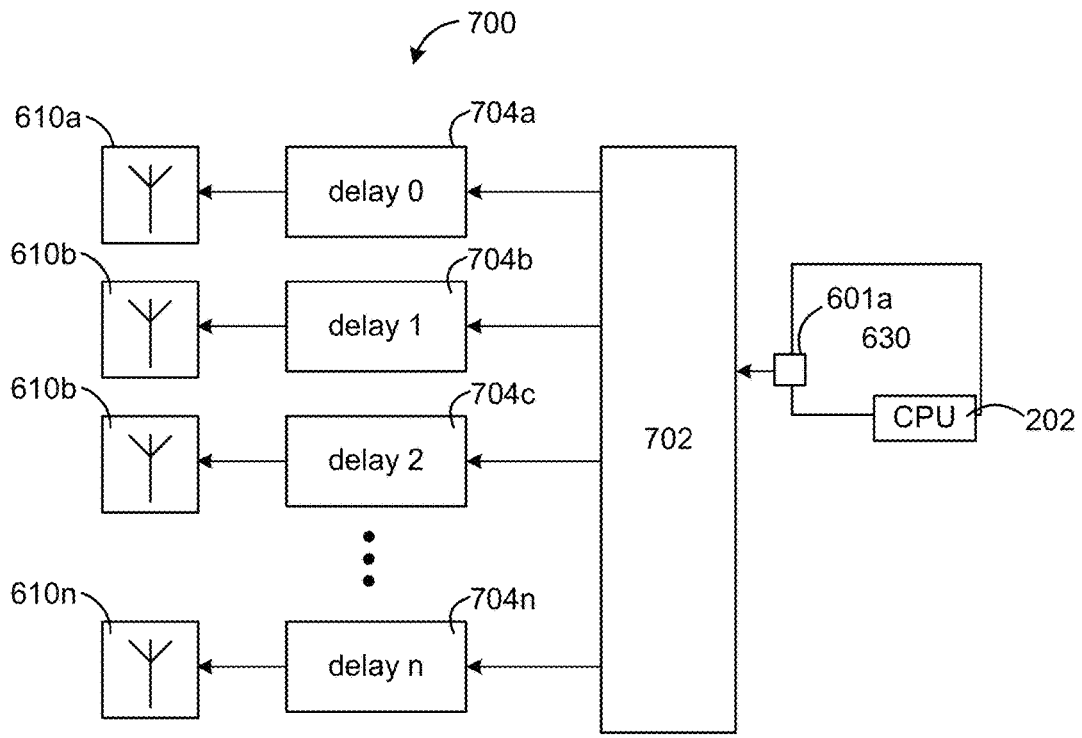
FIG. 7 is a functional block diagram of an embodiment of a delay network for use with the RF front end 600 of FIG. 6.

FIG. 7 is a functional block diagram of an embodiment of a delay network for use with the RF front end 600 of FIG. 6. In embodiments implementing an analog delay, the delay can be included after upconversion but prior transmission by the antenna 610n. Accordingly, the time delay 640 of FIG. 6 can be omitted in embodiments using the analog delay network 700 of FIG. 7. The analog delay could use Surface Acoustic Wave (SAW) delay lines as an example. In some examples, a delay network 700 can be used to generate the delayed copies at RF as in FIG. 6. In this analog implementation, the RF signal from port 601a in FIG. 6 can be provided to a RF power splitter 702 before transmission via the antennas 610. The outputs of the RF power splitter 702 can each be directed to its own respective SAW delay line (delay line) 704. SAW delay lines are similar in construction to the SAW filters used in RF circuits for filtering. The delay lines 704 are depicted as delay-0 704a, delay-1 704b, delay-c 704c, delay-n 704n. Each of the delay lines 704 can have a different delay time. The output of each of the delay lines 704 can be fed to a respective antenna 610. Each delay line can have of a separate delay element or delay line 704. An embodiment may use the same SAW substrate for all the delays. This can ensure that all the delays respond proportionally to variations in ambient temperature and manufacturing and aging effects. In a PON having a single antenna, the delay network 700 may not be present. An advantage of using analog delay lines is now we only need to use one transmit chain 630 to drive the power splitter that drives as many distinct antennas 610 may be needed from the splitter.

With reference to FIG. 6 and FIG. 7, two primary methods for delaying the main signal 112 for each additional antenna 610 are disclosed. In some examples, delayed copies of the signals 112 transmitted from the antennas 610 are advantageous because it allows the mobile device 102 to distinguish the origin of each copy of the main signal 112 (e.g., transmitted from the antenna 610a). This can be thought of as a multiple access method to separate the various copies of the main signal 112. Using either analog or digital delays that are more than one spreading chip period different from one another allows implementation of Code Division Multiple Access (CDMA) techniques as outlined above.

Figure 8:
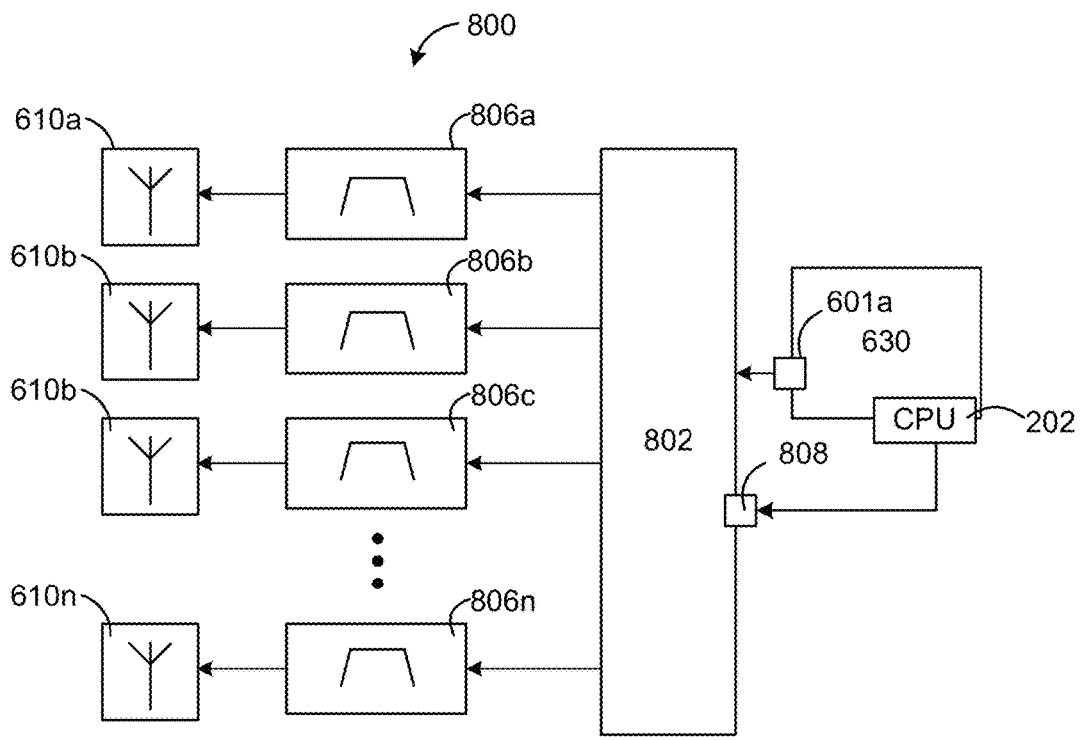
FIG. 8 is a functional block diagram of another embodiment of the delay network for use with the RF front end of FIG. 6.

FIG. 8 is a functional block diagram of another embodiment of the delay network for use with the RF front end of FIG. 6. In some embodiments, a switching network 800 can be implemented between the port 601a and the antennas 610. The switching network 800 can use Time Division Multiple Access (TDMA) techniques to selectively select the transmissions via the RF transmit chain 630. In some embodiments, only one RF transmit chain 630 (FIG. 6) may be needed. The RF signal from port 601a can be supplied to a switching matrix 802. The switching matrix 802 can alternately connect the output port 601a to a number of bandpass filters 806. The bandpass filters are shown as 806a, 806b, 806c, 806n, but may referred to collectively as bandpass filters 806.

The switching matrix 802 can have an input port 808. The input port 808 can receive a switching control input from, for example, the controller 202. This control input can be used to indicate to the switching matrix 802 which antenna 610 is selected for transmission. The antenna paths can be sequentially selected to transmit. The time between transmissions can be analogous to the delay period described above.

In some examples, the signal 112 transmitted by the various antennas 610 can be modulated to identify the antenna 610 from which it was transmitted. Generally, any multiple access method can be used to transmit the signal from the different antennas 610 while at the same time allowing the receiver to distinguish which signal 112 or signal component came from which antenna 610.

Figure 9:
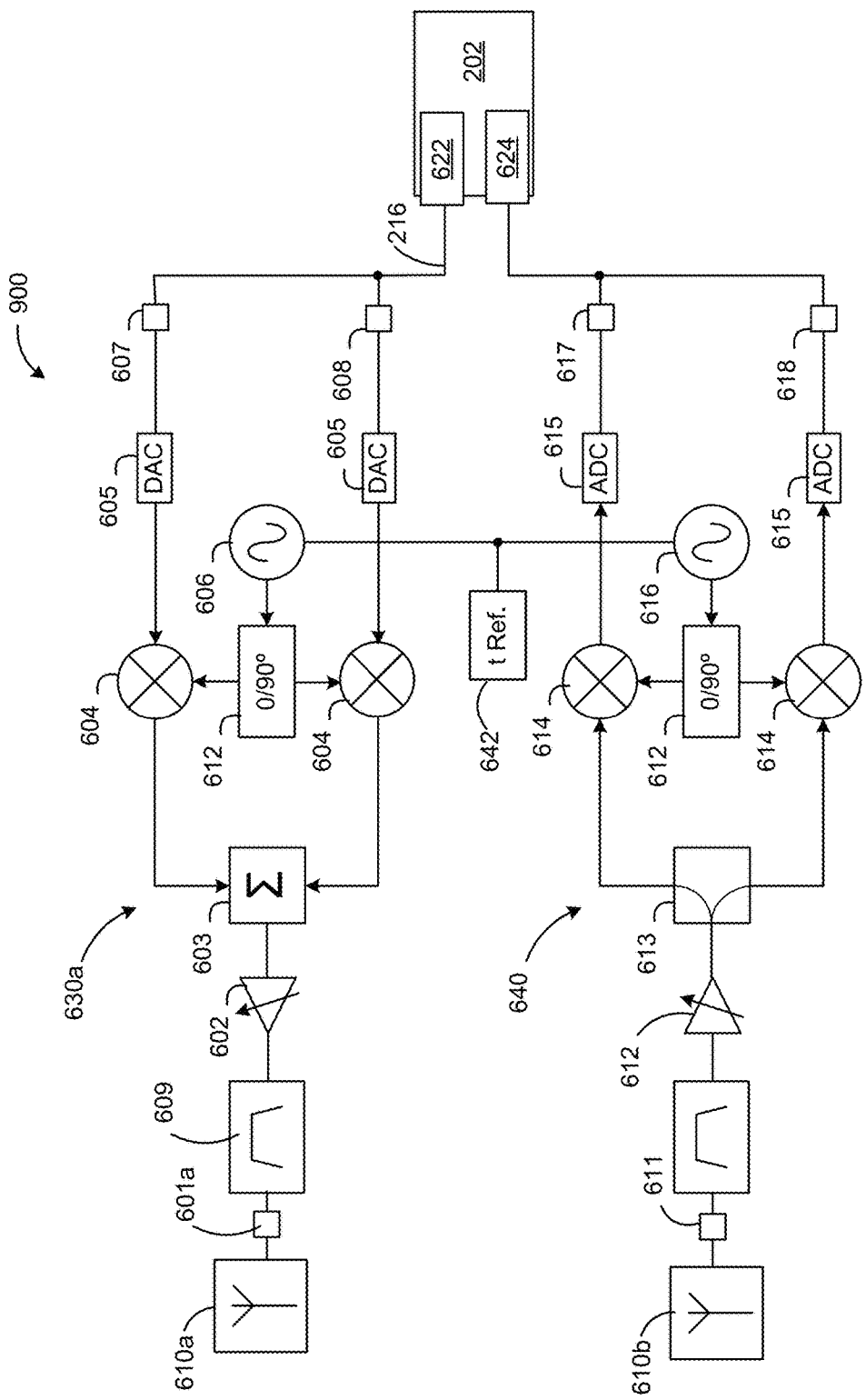
FIG. 9 is a functional block diagram of an embodiment of a radiofrequency front end for the positioning node of FIG. 1.

FIG. 9 is a functional block diagram of an embodiment of a radiofrequency front end for the positioning node of FIG. 1. A front end 900 can have a transmit chain 630 and receive chain 640. As noted above, there may be more than one RF transmit chain 630, however, for ease of description, only one RF transmit chain 630a is shown in FIG. 9. In the RF receive chain 640, a received signal can be received at the antenna 610b and a port 611. The receive chain 640 can also have a bandpass filter 619 coupled to the port 611. The receive chain 640 can also have a very variable gain amplifier 612 (e.g., low noise amplifier or LNA). The variable gain amplifier 612 can adjust in-band power level of the received signal. The adjusted signal can then be fed to a quadrature demodulator consisting of power splitter 613, I and Q mixers 614, and a 90° phase shifter 612. The receive chain 640 can also have a LO 616. In some embodiments, both the transmit LO 606 and receive LO 616 can be coupled to the same time reference 642. In some embodiments, a single LO 616 can synchronize all of the mixers 612, 614 and 604. The time reference 642 can be, for example, a crystal controlled oscillator as in a mobile device. After passing through mixers 614 the signal is then baseband. The in-phase component of the signal and the quadrature phase component of the signal can be digitized using a respective analog-to-digital converter (ADC) 615. Digitized sample data streams can then be output at a port 617 for the I stream and a port 618 for the Q stream.

In some embodiments, the controller 202 can have a transmit processor 622 and a receive processor 624 (e.g., the CPU 204). The transmit processor 622 and receive processor 624 can be baseband processors having separate digital signal processors (DSP) or DSP components. These DSPs can perform operations on high data rate at ports 607, 608, 617, 618. In some examples this CPU 620 can have an application processor governing the operations of the transmit processor 622 and receive processor 624.

In embodiments having only RF transmit chain(s) 630, the CPU 620 may only have the transmit processor 622.

The transmit processor 622 can generate a pseudo random number sequence of +1 and −1 values. These are generated by a Linear Feedback Shift Register (LFSR) using a maximal length polynomial known to the server 120 for each PON (e.g. the PON 110), for example. Each PON (e.g., the PON 200) can implement a different Polynomial to distinguish its signal at the receiver. In an embodiment, all the PONs 200 in the system 100 can use the same polynomial. In the embodiment that uses the same polynomial, each PON 200 can use a different PN code offset to distinguish its signal at the receiver as is done in CDMA communications systems. The sequence may be lowpass filtered in the baseband processor (e.g., the transmit processor 622) to reduce the required RF bandwidth. In other embodiments, the sequence may be left unfiltered, and is then fed to the transmit chain(s) 630. In an implementation, BPSK modulation can be used so only one sequence, I, is generated. This sequence is then fed to a rotator (FIG. 10) that can shift the center frequency by a determined amount. Despite being fed with a single sequence, the rotator produces an I and a Q sequence of samples at ports 607 and 608. The result is that the RF signal at the port 601 is a BPSK modulated carrier at frequency that is equal to the sum of the LO frequency and any shift frequency added by the rotator. The signal can be BPSK modulated by the pseudo random sequence.

Figure 10:
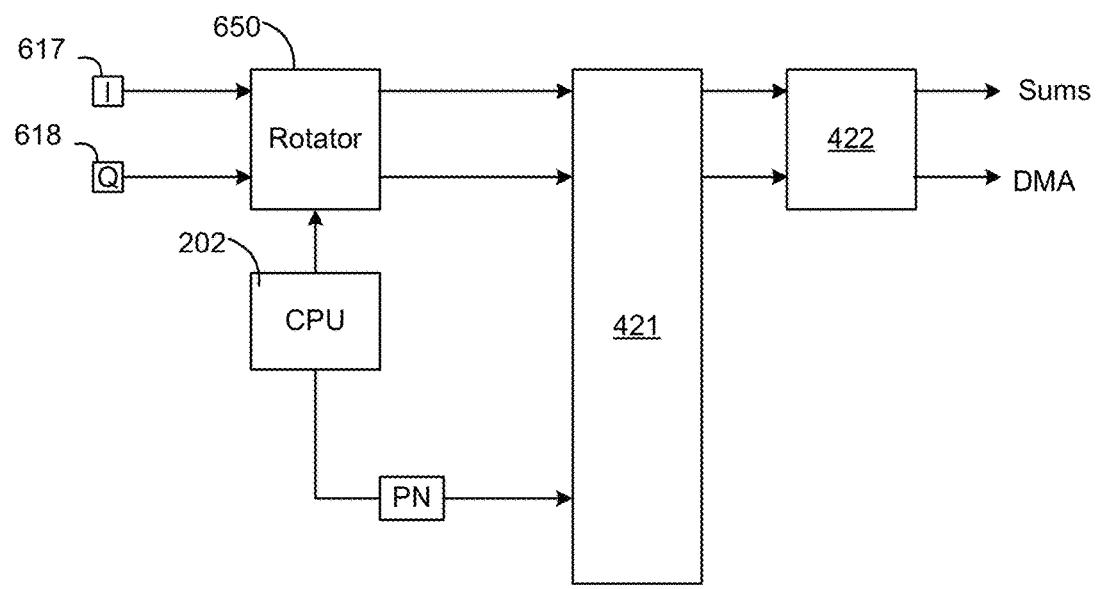
FIG. 10 is a functional block diagram of an embodiment of a portion of the positioning node of FIG. 1.

FIG. 10 is a functional block diagram of an embodiment of a portion the positioning node of FIG. 1. As shown, in FIG. 10, the port 617 and the port 618 can be coupled to Rx I and Rx Q inputs of a rotator 650. The controller 202 can provide a receive (Rx) rotation value. The rotation in the rotator 650 is intended to cancel the rotation superimposed on the signal by the transmit processor 622. The rotated samples can be fed to a bank of correlators 421 supplied by the same pseudo random sequence used by the transmit processor 622 above as was used to spread the signal. The sequence is provided to the mobile device 102 from the server 120 or identified in the beacon or signal 112 that identifies the respective PON 110.

Each correlator in the bank of correlators 421 can generate a sum of I and Q values. For example the sum generated for I would correspond to the sum over a large number of input samples with each input sample multiplied by one chip of the PN sequence corresponding to a given hypothesis. These sums can be passed on to the controller 202 through a direct memory access (DMA) interface 422. For each correlator hypothesis, involving a guess of correct PN code phase and rotation rate, an $I_{sum}$ and a $Q_{sum}$ is generated. The magnitude of the sum is equal to $\sqrt{I_{sum}^2 + Q_{sum}^2}$. We compute this magnitude and look for peaks. We will notice a cluster of peaks with each peak corresponding to a signal from one of the beacons radiating antennas. The peaks show up spaced in time by the delays introduced by the saw filters. The phase of each signal is computed by taking the $\tan^{-1}$ ($Q_{sum}/I_{sum}$) for each correlation peak, using the signs of $I_{sum}$ and $Q_{sum}$ to resolve the quadrant of the angle. We then adjust the detected phase by the change of phase that was introduced by the delays. Then, the phase of the main signal (e.g., the signal 112*a*) is subtracted from the phases of each of the delayed copies of the signal 112. The result are the carrier phase differences $P_a$, $P_b$, and $P_c$ used in the location calculation for the mobile device 102 and the location of the mobile can be determined as outlined by the math above in connection with FIG. 4 and FIG. 5. FIG. 10 indicates that there is one rotator 650 for each correlation bank 421. An embodiment may have multiple rotators 650 coupled to subsections of the correlator bank 421 in order to search in time and frequency (rotation) simultaneously.

When computing the residual phase, we can be off by one or more wavelengths due to the fact the phase wraps around every 360 degrees. Hence when computing the location solution, we compute the solutions using multiple hypotheses for each $P_a$, $P_b$, and $P_c$. Instead of one computed solution, we end up with multiple possible solutions. Fortunately, it is easy to choose the correct solution using common sense physical constraints, such as rejecting negative ranges. Additional antennas 610 in the PONs 200 (e.g., the PONs 110) within a room further add to the robustness of the chosen solution. Other Kalman filtering and sensors fusion techniques may be employed to resolve the ambiguity.

In the embodiment described above, pseudo random sequences of +1 and −1 can be used to modulate the location signal, e.g., the signals 112. In reality any signal and any modulation can be used. In the receiver within the mobile device 102, instead of correlating the received signal against a replica of the +1 and −1 pseudo random sequence that was used to modulate the signal 112, we can instead correlate the received signal against delayed copies of itself. This method can produce peaks for each delayed copy of the main signal regardless of the type and shape of the main signal. It is important to mention here however that the bandwidth of the main signal dictates the minimum delay that would be needed among the delayed copies to tell them apart. More specifically, the larger the bandwidth of the main signal, the smaller the required delays and correlation time, need to be. One example could be a variable frequency modulation, such as a chirp signal. Another example can be to modulate the carrier with pure noise generated in the beacon (e.g., the PON 110) using natural phenomenon such as diode avalanche noise source. Even though the noise signal is totally random and cannot be replicated at the receiver within the mobile device 102, it can still correlate with a delayed copy of itself at the receiver. Finally, the signal could be the same signal currently radiated by a standard low energy Bluetooth beacon currently used for proximity applications.

In some embodiments, (e.g., those described in connection with FIG. 7) described above, we used SAW delay lines. However, any other delay components and mechanism can be used. When the bandwidth of the radiated signal (e.g., the signal 112) is large, the required delay may be small. In this scenario, the delay lines (e.g., the delay lines 704) using loaded wire traces on printed circuit boards with high permittivity, high dielectric constant, and high permeability, high magnetic constant, could also be used. Meta material structures that result in slow RF group delays can also be used.

There are two components that directly affect the accuracy of the location determination. The first is the inaccuracy of the LO frequencies at the beacon and the mobile device. The second is the temperature drift of the delays of the delay element at the beacon.

The mobile device 102 may be in constant contact with various cell towers in a given cellular system. The mobile device 102 can continuously calibrate its LO based on reference signals from the cellular systems. Therefore, the LO in the mobile device 102 may be locked to a very stable frequency reference. Once locked to a cellular frequency reference, the LO of the mobile device 102 can beat against the incoming signal 112 from the PON 110 and can calculate any frequency error present the LO 606 in the transmit chain 630 of the PON 200, for example. Using this procedure, the effect of frequency errors in the LO of the PON 200 and the mobile device 102 can be minimized or even eliminated.

This is possible because for the most part for indoor positioning the mobile device 102 is not moving fast enough relative to the PON(s) 200 (e.g., the PON 110) or to a WAN cell to result in significant Doppler shifts between the PON(s) 110 and the mobile device 102 receiving the signal 112, and between the cellular system reference and the mobile device 102. If the mobile device 102 is not connected to a cellular system, then any one of a number of frequency references in the air can be used. In one example, a strong FM station with known frequency can be used. Another is the frequency and time standard broadcast throughout the US on 5 MHz, 10 MHz and 20 MHz.

A number of methods can be used to calibrate out the variation in delays of the delay elements 704 of the PONs 110.

In a first method, the PON 110 can continuously measure the delay and report it to the mobile device 102. The PON 110 can have a receiving circuit (e.g., the receive chain 640 of FIG. 9) that compares the time of arrival between a signal at the transmit port and a delayed copy of the signal from one of the outputs of the delay element. Because all the delay paths use the same delay element substrate, the delays may all linearly track each other. The delay drift measured on one port gives enough information to predict the drift on all of the other ports. This drift is then reported to the mobile device 102 so that the delay drifts can be accounted for at the receiver of the mobile device 102. The mobile device 102 can also report this information to the server 120 for use by other mobile devices 102 in the future.

A second solution is for the PON 110 to shift the carrier frequency in a pre-determined manner during transmission. This may provide sufficient information at the receiver of the mobile device 102 to isolate and account for the various element delays.

A third method can implement multiple delayed copies on the same antenna 610. In the implementation described in connection with FIG. 8, a single antenna 610 can transmit one copy of the main signal 112*a* delayed by the delay element. In this implementation the same antenna can also transmit another delayed copy distinguishable from the rest by a longer delay path within the same delay element. The delay network 800 can produce two distinguishable copies for one of the antennas 610. At the receiver of the mobile device 102 we are able to measure the difference in delay directly because the signals 122 are transmitted from same antenna 610. Measuring the time of arrival difference and knowing what the delay difference is supposed to be, the delay drift in the delay network 800 can be readily calculated and used to compensate the delays of all of the other copies of the other antennas 610, if present.

To prolong battery life, the PON 200 may not transmit a location signal continuously. The PONs 200 may periodically broadcast an identifying message via, for example, a Bluetooth beacon. The mobile device 102 receiving such an identifying message can query the server 120 as to the location and characteristics of the PON 200. The mobile device 102 can transmit a request to the PON 200 to transmit the DSSS location signal (e.g., the signals 112) at a certain power level, duration, and bandwidth. This transmission maybe under control of the server 120. The mobile device 102 can specify the power level, duration, and other characteristics of the location signal 112 based on the degree of accuracy required by, for example, the mobile device 102. With possible multiple requests from multiple mobile devices 102, the PON 200 can transmit the best possible signal that can be used by all requesting devices. The PON 200 can transmit the required signal for the duration requested and the requesting mobile device 102 can determine its own location accordingly. In commercial installations where a source of power is available, the PON 200 conservation of battery power may not be a concern. Therefore the PON 200 may instead continuously or periodically transmit the identifying message as well as the location DSSS signal without awaiting any request.

In an implementation where the mobile device is the transmitter, the mobile contains a transmit chain 630 (FIG. 9) and accompanying support hardware and software in the baseband and application processors (e.g., the transmit processor 622 and the receive processor 624). For example, assume the mobile device 102 transmits a DSSS modulated RF signal using a known pseudorandom number sequence. The same signal 112 can be received at each of the individual PON antennas 610 with different phases depending on the physical relationship between the PON 200 and the mobile device 102. At the PON 200, two methods can be used to measure the phase relationships. One implementation can use a separate receive chain 640 of FIG. 9 for each antenna 610. In the receive processor 624 each data stream from each receive chain 640 can be processed separately and the phase information recovered. The phases can then be differenced and the required carrier phase differences $P_a$, $P_b$, and $P_c$ can be detected to be used in the position calculation mentioned previously.

An alternate architecture uses an RF switching matrix similar to the switching matrix 702 (FIG. 7) but used in reverse direction. Now the common port of this switching matrix 702 can be coupled to a single receive chain 640 (FIG. 9). The other ports of the switching matrix 702 can each be connected to separate antennas 610. During reception, the switching matrix 702 can switch sequentially between each antenna 610 and dwell in that connection for a short time. During this time, the detected phase at the baseband processor (e.g., the receive processor 624) can be assigned to the antenna 610 currently connected and receiving. When the switching matrix 702 switches to another antenna 610, the detected phase is assigned to that antenna 610 and so on. With this architecture, we can detect the phase of the carrier as received at each antenna but by using one receive chain 640. So instead of detecting the carrier phase differences $P_a$, $P_b$, and $P_c$ simultaneously, this architecture detects the phases sequentially. The dwell time is long enough to gather enough signal to result in accurate phase estimations but not too long that the phase differences change from one switching period to another. For typical applications 1-10 millisecond dwell time per antenna 610 should be sufficient for signal to noise ratio (SNR) and short enough for the phases not to have changed due to mobile movement. In the above descriptions, $P_a$, $P_b$, and $P_c$ may represent differences in carrier phases. The same may be true in implementations using DSSS code phases. With sufficient SNR, interpolation within code phases can also yield a usable estimate of the length differences among the path from each antenna leading to position resolution.

Node Synchronization

In order to provide accurate three-dimensional position information using OW-TDOA, either the internal clocks of all of the PONs 110 are synchronized or the time offset is accurately quantified. In embodiments in which the clocks of the PONs 110 are synchronized, and the mobile device 102 can perform calculations based on a single or universal timing for all of the signals 112 received from the PONs 110. Alternatively, if the clocks of the PONs 110 are not synchronized but their time offsets relative to each other are known at the mobile device 102, the mobile device 102 can use this measured time offsets to correct for the lack of synchronization between the PONs 110 and still compute its three-dimensional position.

A two-step process can be implemented to synchronize the PONs 110. The first step is frequency synchronization, followed by time synchronization, described below. In a first step, the internal oscillators of the PONs 110 lock to a common frequency source. For example, this can include synchronizing one or more reference oscillators (e.g., within the controller 202). Once the clocks of the PONs 110 are synchronized, these clocks may still have arbitrary time offsets relative to one another. However, these offsets may remain constant because all the reference oscillators of the PONs 110 are locked to a common reference. In some embodiments, it may not be critical that the locked frequency of the PONs 110 have absolute accuracy. The important aspect of this synchronization is that the PONs 110 has frequency and phase lock with the reference. Phase locking the PONs 110 facilitates carrier phase ranging measurement techniques resulting in high position accuracy. In addition, smart phones may have accurate frequency reference from a cellular network that can calibrate any large frequency offset error between its own internal oscillator clock and a constellation of PONs 110 within the indoor environment 106.

Frequency Synchronization

In some embodiments several methods may be used to lock the frequency of the PONs 110. Some methods can use references that are external to the PONs 110 while other methods can use shared references within the PONs 110. For example, an external timing reference can include carrier frequency of a nearby radio or television broadcast station. The PONs 110 can further have a receiver that can tune to the carrier of the local TV, radio station, cellular signal, or other radiofrequency source. The station can provide frequency reference to all the PONs 110 tuned to the same station frequency modulated (FM) radio stations operating frequencies that are low enough to penetrate to the indoor environment 106. For example, one station of note is the WWVB NIST (which is the radio station callsign for the National Institute of Standards and Technology longwave (60 Kilohertz) Standard Time Signal station in the United States) and similar stations worldwide such as the NPL NSF signal in the United Kingdom. WWVB is broadcast on 60 kHz and is intended for reception throughout the United States. The PONs 110 can then use such a radio signal as the reference frequency, thus providing frequency lock with the other PONs 110 in the indoor environment 106.

However, radio frequencies may not always penetrate to the location of all of the PONs 110. For example, signal transmitted in the middle of the country may be weak on the coasts. In addition, certain radio frequencies may not have sufficient reception deep indoors, such as with a parking garage.

In an embodiment, one or more of the PONs 110 may be coupled to a main power line providing 50 or 60 cycle power. For example, the PON 110a may be a single antenna PON within a light bulb or smoke detector. The PON 110a can thus be coupled to the 50-60 Hz power line frequency to lock the local oscillators of the PON 110a to a single reference. The other PONs 110 within CDs can perform a similar synchronization with the main power line. In some examples nominal frequency of given powerline can drift by as much as 5%. Thus the absolute value of the frequency may not be accurate to use as a reference for absolute RF carrier center frequency or range measurement. The frequency drifts slowly and over a wide geographic area, thus it can still provide a common or relative reference that varies equally across the PONs 110. The mild variations in frequency or timing can be corrected for as described below.

In some examples, a 50 or 60 cycle powerline signal can be filtered to remove powerline noise and then can be used as a reference to a phase locked loop (PLL) with a long time constant. Such a time constant may be as long as several seconds or minutes. This 50 or 60 Hz reference drives its own PLL to generate a frequency that is the same as the nominal frequency of the reference oscillator 642 in the PON 110. This locally generated frequency by the 50 or 60 Hz driven PLL is compared to the reference oscillator 642 within the PON 110. This oscillator 642 can be a crystal oscillator or a ceramic resonator with good absolute accuracy but poor drift performance. Each PON 110 can measure the power line derived frequency against its own local oscillator. Information related to the differences between powerline frequency and its own oscillator can be provided to the server 120 either through direct coupling of the PONs to the Internet or through a passing by within range mobile device 102 with Internet connectivity. The server 120 can store such information and in turn provide timing information to the PONs 110. The PONs 110 can then use the same divider relationship of the divider in the PLL that uses the power line as a reference. As a result, all the reference local oscillators 642 within the PONs 110 are slaved to the power line frequency and hence all the nodes are frequency locked.

A second method can implement a ranging signal emitted by each PON 110 to synchronize their respective clocks. Each PON 110 can transmit a ranging signal at the same carrier frequencies, for example, BPSK spread with various PN spreading codes. If one PON 110 demodulates the ranging signal from another PON 110, the detected Doppler shift of the received signal can provide a measurement of the reference frequency offset among the PONs 110. If each PON 110 adjusts its own local reference oscillator to drive the median of the Doppler shifts from all the detected signals to zero, eventually all of the PONs 110 will be frequency-locked to one another.

This second method can further improve synchronization by adjusting the dividers of the PLL tracking the 60 Hz of the main powerline to generate a reference frequency identical to the locked frequency obtained from receiving the ranging signals of other PONs 110. If the PON 110 is unable to receive the ranging signals from other PONs 110 to maintain frequency lock for some time, the PONs 110 use this 60 Hz main power line derived reference to maintain frequency synchronization until it can receive the ranging signals from the other PONs 110 again.

In another embodiment, each PON 110 can alternately transmit a low power carrier (e.g., a timing signal) onto the main power for reception by the other PONs 110. If all the PONs 110 can adjust their local reference oscillator to the median of the injected carriers they receive from the other PONs 110, then eventually frequency synchronization can be achieved. The frequency of the injected carrier can be several orders of magnitude above 60 Hz so that the main high voltage frequency can be filtered out at the receiver.

In another embodiment, smoke detectors (e.g., CDs) installed in new construction during the last couple of decades all have a low voltage common wire tying all the smoke detectors within the same locale (e.g., the indoor environment 106). This low voltage wire can be used to ensure that all of the smoke detectors in the same vicinity sound an alarm whenever any of them detects smoke. The standard indicates that this wire is kept at low to zero voltage during non-alarm conditions. Any detector that detects smoke sounds the alarm and raises the voltage on this wire to 5V-9V. This higher DC voltage is detected by all the other smoke detector units and all sound the alarm as well. In an embodiment, one of the smoke detectors having a co-located PON 110 can transmit a low voltage AC signal on this wire. Other smoke detectors (e.g., PONs 110) can detect this low level AC signal and use it to lock their reference oscillators thus providing frequency locking among the PONs in the detectors. Furthermore, this AC signal can be modulated using any of the RF modulation techniques known in the field to convey time information as well. This common low voltage signaling using a wire that is already installed provides a robust way for frequency and time synchronization among the smoke detectors. The same principle can be implemented in other systems having for example, wired alarm sensors.

Time Synchronization

The second step in synchronizing the nodes is to measure the time offset among the local clocks of the PONs 110 and compensate for them. Three methods are disclosed herein.

A first method uses two-way WiFi packet exchanges among the PONs 110 collocated with light bulbs (e.g., light bulb nodes). The PONs 110 can be co-located with WiFi modems within the CDs. These WiFi modems may be standard WiFi modems having an additional capability of precise timing resolution of when a given WiFi packet is transmitted or when another is received according to its own local clock. Periodically, with very low duty cycle that has negligible impact on the WiFi network, each PON 110 can engage in a two-way communication with each of the other PONs 110. Because these WiFi modems have a precise timing resolution of the Tx and Rx timings of the packets according to their own clocks, after the two-way exchanges among all the nodes there would be enough information to measure and correct all the clock offsets among all the PONs. At this point, the PONs 110 may be locked in frequency and aligned in time enabling the very advantageous OW-TDOA ranging methodology with unlimited simultaneous users (e.g., multiple mobile devices 102), the same way that is done in GPS. Standard WiFi transceiver were not directly designed for ranging purposes. Even though the 802.11 standard states the turnaround times between receiving a packet and returning an acknowledgment, the allowed tolerance could be as high as 1 microsecond (us) resulting in an error of 300 meters. The embedded WiFi transceivers within these CDs and smart bulbs have very precise and calibrated transmit and receive time stamping and measurement done in hardware in the physical layer to achieve sub nanosecond timing.

A second method to achieve time synchronization is for each node to alternately inject a narrow pulse into the main power line (e.g., via the power supply 208) at the zero-crossing moment of the power signal. The transmitter (e.g., the transmitting PON 110) of the pulse would note the time of transmission according to its own local clock. Other PONs 110 can detect this narrow pulse and record the time of detection according to their own local clocks. After each PON 110 has injected or transmitted its own pulse, all of the transmit and receive timing data is conveyed to the server 120. The server 120 now has sufficient data to determine all the offsets among the clocks of all of the PONs 110. This technique works because of the assumption that the travel time for a narrow pulse on the power line is equal in both directions between any given two PONs 110. It is important to note here that the power line may be an unmatched, unterminated, and branched network. Hence, we would expect to receive several reflected pulses at the receivers (e.g., the PONs 110) for every injected pulse by a transmitter. The receivers (e.g., the PONs 110) therefore need to be able to isolate these multiple reflected pulses and lock onto the first arriving pulse. This method can use the low voltage signaling wire that connects all late model smoke detector as mentioned above.

A third method uses the timing of the ranging signal that is emitted by each PON 110. These ranging signals are described below. In some examples, the ranging signals can be transmitted at a known and precise time according to the clock of the transmitting PON 110. Furthermore, these ranging signals can have a structure that allows the receiving PONs 110 to accurately measure the receive time according to the local clock of the receiving PON 110. A protocol after which every PON 110 would have received and timed a ranging signal from every other PON 110 can generate enough data to compute all the clock offsets among the nodes (e.g., the PONs 110). This process is enabled when the RF path from one node to another is symmetrical in both directions. This assumption holds true if the time elapsed in between reversing the direction of the path is small enough not to encompass indoor environmental changes. We will mention more detail of how this is done when we describe the emitted ranging signals from the PONs.

We locked the frequencies first because that means that once the clocks of the PONs 110 are aligned they remain aligned. Therefore, we do not need to repeat the clock synchronization procedure more than once. In other words, once the nodes (e.g., the PONs 110) are frequency-locked and clock-aligned, the PONs 110 turn to continuously transmitting their ranging signal and are invisible to any adjacent WiFi network or other resources that were used to align the clocks.

We see that some of the above frequency locking and time offset measurement and correction procedures require supervision by a dedicated positioning server reachable through the internet (e.g., the server 120), while others are cooperative among the PONs 1120 and do not need server intervention.

An alternative to locking the time and frequency of the nodes (e.g., the PONs 110 is to let the node free run. Instead of locking frequency and time, we measure the differences among the PONs 110 and communicate the frequency and time offset to the server 120. The mobile device 102 entering the indoor environment 106 can receive this information from the server 120 and uses it in the equations for determining time the time of flight of the signals 112 thus nulling the effect of lack of synchronization. Measurement of time and frequency offset can be done externally to the PONs 110 or internally using one of the methods outlined herein. Externally, the mobile device 102 can measure the frequency offset error among the various PONs 110. This is because these frequency offsets show up as carrier Doppler that the mobile device 102 can measure and for which it can correct. Timing offsets can be measured using a stationary device located somewhere in the vicinity with a known relative physical location to the PONs 110. Measured time and frequency offsets can then be uploaded to the server to be used by mobile devices.

Positioning Nodes Ranging Signals

The PONs 110, now synchronized, can continuously transmit a multiple of signals designed specifically for ranging. To prevent jamming other wireless equipment operating in the same band, the PONs 110 output power is set at or below the maximum allowable power mask set by the FCC in the US and below the more stringent limitation set by the ECC for Europe for unlicensed emitters operating in licensed or unlicensed bands. Complying with both the Federal Communications Commission (FCC) and the Electronic Communications Committee (ECC) power limits insures compliant operation globally. The masks mentioned are set to regulate the operation of Ultra-Wideband (UWB) devices and are set at −70 dBm/MHz for operation from 2.4 GHz to 10 GHz by the ECC. The FCC sets the limit at −41 dBm/MHz. In some embodiments, the PONs 110 can transmit the signals 112 at a level below the mask or masks established for (indoor) UWB transmissions. Accordingly, in some embodiment, the signals 112 can be transmitted at a level below −41 dBm/MHz according to the FCC mask or below −70 dBm/MHz according to the ECC mask.

In some embodiments, the PONs 110 can transmit three ranging signals. All are binary phase shift keying (BPSK) modulated and directly spread using a pseudo noise (PN) sequence generated by a gold code or a maximal length polynomial linear feedback shift register (LFSR) with a very long period, possibly days. The three ranging signals differ from each other by the degree of position accuracy they enable and by the complexity of the receiver that would be required to decode them.

The first signal, we designate LPX, consists of two components LPX1 and LPX2. Each having a center frequency placed within the 2.45 GHz ISM band and spread with a chipping rate of around 10 Mega Chips Per Second (10 MCPS). Typically, LPX1 and LPX2 are positioned as far away as possible from each other within the 2.45 GHz ISM band, to improve wide lane accuracy, while avoiding strong high duty cycle jammers. LPX1, LPX2 center frequencies is chosen by the server as part of radio link management. LPX2 is also sometime swept from a starting frequency to an ending frequency to aid in improved timing recovery.

The second signal, we designate LPY, consists of two components LPY1 and LPY2. LPY1 and LPY2 use a spreading rate of 50 Mega Chips Per Second (50 MCPS). LPY1 has a center frequency placed within the 5.8 GHz ISM band and a null to null bandwidth of 100 MHz. LPY2 is positioned 250 MHz away on either side of LPY1. This puts LPY2 outside of the 5.8 GHz ISM band. We place LPY1 within the 5.8 GHz band to allow receivers that already have a 5.8 GHz WiFi receivers to leverage most of their existing RF front end. At 50 MCPS, receiving and decoding only LPY1 would still yield useful accuracy. However, for higher accuracy, the receiver can also receive LPY2. With wide lane techniques applied to 250 MHz separation, the wide lane wavelength is 1.2 meters making it easy to resolve the integer ambiguity in real time. At 50 MCPS, multipath transmissions greater than 6 meters can be resolved. So multipath effects are reduced compared to LPX1 and LPX2 for large venues but are not eliminated and still limit accuracy in small rooms.

The third signal, we designate LPZ, consists of one component LPZ1 placed somewhere within the 3.4 GHz to 10.6 GHz band away from existing jammers and having a spreading rate of 1 Giga 500 Mega Chips Per Second (1 GCPS500 MCPS) which provides greatest accuracy due to robust multipath resolution capability. At this chipping rate, RF signal paths differing by more than 30 cm are resolved and multipath is greatly mitigated.

The exact center frequencies of these signal components are under the supervision of the internet-reachable positioning server, such as the server 120.

For all LPX's, LPY's and LPZ ranging signals, the center frequency of each is the same for all the nodes within the vicinity. For example, LPX1 would be transmitted at the same center frequency by all the PONs in the vicinity. The signals are distinguishable from each other using different code offsets of the PN sequence that is used to spread each signal. We can also use entirely different codes to distinguish the signals as well. CDMA cellular deployments use code offset to distinguish signals from each cell, while GPS uses differing gold codes to distinguish between satellites. Since we are indoors, the distances are much shorter and the PN code search space is also smaller dues to shorter distances and absence of fast relative movements and hence lower Doppler search space. Therefore, for our purposes we can use either code offset or varying codes to distinguish among the PONs. Our preferred embodiment uses code offsets.

We include these three components of LPX, LPY and LPZ so that mobile devices (e.g., the mobile device 102) can migrate to higher position accuracy in the future as their hardware advances and allows them to decode the higher bandwidth signals that are more demanding to receive and process. Also, some positioning applications do not need the higher accuracies and hence the mobile can revert to decoding the lower bandwidth signal(s) to save cost, complexity and power.

It is important to note that an implementation of the system described herein may use slightly different center frequencies, power levels, bandwidth, modulation, or spreading rates or codes. In some examples, the nodes (e.g., the PONs 110) broadcast several signals with higher and higher bandwidth for higher accuracy by more and more complex receivers. The mobile device 102 can also determine its position by receiving and decoding the PONs transmitted ranging signals using One Way Time Difference of Arrival (OW-TDOA) from PONs to mobile transmissions thus allowing unlimited simultaneous users. In addition, co-locating the PONs 110 in smart light bulbs or other appliances around the house with IOT connectivity such as connected kitchen appliances for example, allows for a continuous source of power and synchronization and eliminates the need for custom installation and maintenance of the indoor positioning system 100. This is especially true if we recognize that most of the light bulbs are expected to be replaced by smart light bulbs in the coming years due to more stringent energy saving regulation. Embedding indoor position location capability within these light bulbs gives the end users further incentive in addition to energy saving to replace the light bulbs with more efficient ones. PONs could also be located within power outlets.

More Details about Using Ranging Signals for Node Synchronization

The following is a description of frequency and time synchronization method using the ranging signals emitted from each node (PON 110) in more detail.

For all nodes or the PONs 110, LPX1 is continuously transmitted centered on the same channel. Please note that a node actively transmitting an LPX1 signal cannot receive LPX1's from other nodes because the much higher signal level of its own transmitter masks out the much weaker signals from other nodes (PONs 110). So, in order to receive the LPX1 signals of other nodes, the local node needs to momentarily turn off its own transmitter. Doing so allows it to detect the LPX1's from all nearby nodes or PONs 110. If we turn the transmitter on average for half the time relative to continuous transmission, we lose 3 dB of signal power as seen by receivers wishing to correlate the LPX1 of this node. To achieve frequency lock and time synchronization, it is desired for all PONs 110 to detect the LPX1's of all of the nearby PONs 110. For robustness, no single PON 110 assumes a master role in this synchronization and hence all the PONs 110 can run identical protocols.

In some examples, any given node is active for exactly a period T, where T is in a 10's of microseconds range. After T seconds, the transmitter (e.g., the transmit chain 630) can be deactivated for an arbitrary period between 0 and 2T seconds and then reactivated for T seconds again to repeat the cycle. The random off period can change every cycle. If all the nodes (PONs 110) do this using different randomization sequences, then each node can transmit with an average duty cycle of 50%. Furthermore, each node can receive the signal from another node, when its transmitter is off and the transmitter of the other node is on, for an average of 25% duty cycle. Therefore, with this method, an outside receiver receives a signal that is 3 dB lower than if the transmitters were left on all the time. And the nodes receive the signal power from other nodes on average 6 dB lower than in the case of continuous transmission. This loss among the nodes can be acceptable since they can correlate for a long time and since all of them are stationary. The loss for other mobile receiver is well within the system limits. By using limits other than 2T, we can change the resulting duty cycles if the application demands it.

To summarize, each node turns on its transmitter for a period T. Then turns off its transmitter for an arbitrary time between 0 and 2T. After that it turns on its transmitter for a period T and the cycle repeats. The arbitrary time between 0 and 2T is chosen with a uniform probability distribution when averaged over several cycles. It is important that regardless of the cycling of the state of the transmitter, that the PN sequencers and generators keep running as if the transmitter remained on. This is important because it allows the receivers to keep correlating as if the transmitters are always on; resulting in a tolerable power loss of the detected signal of 6 dB and avoids complete loss of synchronization due to the random turn on and turn off times of the transmitters.

On the receiver side of the PONs 110, the receivers can insert zeros into the correlators whenever their transmitters are on to prevent self-jamming. As noted above, the nodes can use long period gold codes to spread each of their LPX, LPY and LPZ's. To shorten the correlation search times each node can periodically transmit a WiFi packet to the Access Point (AP) indicating the current time offset from the code starting state, all ones. Receivers wanting to detect the node, can use this information to reduce the set of searched hypotheses. During initialization and prior to frequency locking, each node can have a frequency offset relative to other nodes due to local reference oscillator frequency offset error. The differences in frequencies among the nodes show up as imposed Doppler shifts on the received signals by another node. Prior to frequency locking, each node has a two-dimensional search space. One dimension looks for the code phase and the other for the Doppler. Once it detects the signal from as many of the surrounding nodes it sees, it makes note of the Doppler imposed on each received signal from a given node. The receiving node then calculates the median of the apparent Doppler shifts and slowly slews its reference oscillator to drive this median Doppler to zero. The receiving node also slews the rotators in the base band accordingly to maintain lock on all the received signals. When this slewing is done by all the nodes, frequency lock is achieved. A receiving node (e.g., PON 110) can determine that it is in frequency lock with other nodes when it does not see any Doppler and the phase of the received signal from another node remains stationary. It is important that the time constant for the feedback system for slewing the local oscillator be large to prevent locking to wrong solution. This is because it is possible that the ranging signal travels from one light bulb (e.g., and collocated PON 110) to the next not using Line-Of-Sight (LOS) path. This is because light bulbs can be nestled within metal reflectors and that the strongest path from one ceiling mounted light bulb to the next would bounce off metal objects on the floor. For timing purposes, it does not matter if the path of the signal from one light bulb to the next takes line of sight path or not. This is because we can safely assume that the channel would be symmetric in both directions and hence the time of flight, despite not being line of sight, would still cancel out. The foregoing assumes using LPX signals for timing and frequency locking, however, the LPY or LPZ can also be used for the timing and frequency locking.

If the light bulb and collocated PON 110 is equipped with a receiver (e.g., the receive chain 640) that can decode LPY or LPZ then this receiver is able to lock onto the signal and resolve the integer carrier ambiguity. This is because the spreading rate of these signals, LPY at 50 MCPS and LPZ at 1 GCPS, is high enough so that normal interpolation within one chip given a good SNR is sufficient to resolve the integer carrier ambiguity. Once that is resolved, timing synchronization is possible to a fraction of a nanosecond or better. With LPZ, the high spreading rate allows for multipath resolution and much tighter time synchronization as well bur requires a more complex receiver.

If the receiving light bulb (and collocated PON 110) uses LPX signals exclusively, then that bulb can decode LPX1 and LPX2. Using wide lane techniques, the center frequency difference between LPX1 and LPX2 could be as high as 80 MHz. This results in a wide lane wavelength of 3.75 meters given the 80 MHz separation. Interpolating within this wavelength to the resolution typically possible with good SNR resolves the integer carrier ambiguity and leads to sub-nanosecond time synchronization while only using LPX signals and hence a simpler low bandwidth receiver at each bulb.

An alternate method to resolve the carrier integer ambiguity is to synchronously change the frequency of LPX2. We slide the center frequency of LPX2 from 2.41 GHz to higher frequencies both at the transmitting node and at the receivers of other nodes. As we increase the frequency of LPX2, and given that the distances between the nodes are fixed, the carrier phase detected at the receivers will change. If we change the frequency from f1 to f2, the phase will change from Phi1 to Phi2. We find that the rate of change of the detected phase as a function of center frequency change is directly related to the distance between the nodes. We use this technique to resolve the integer carrier ambiguity among the nodes and therefore achieve timing and clock synchronization among the nodes that is better than a fraction of a nanosecond. We describe this technique in more details below.

We start from the state where all the nodes (e.g., the PONs 11) have already achieved frequency locking by receiving and decoding LPX1 and going through the frequency locking method described above. LPX2 is now like LPX1 but changes frequency from that of LPX1 to a higher frequency and back again to the frequency of LPX1. A receiver that locks to LPX1 has the same code phase of LPX1. Knowing the code phase of LPX1, the receiver knows the exact code phase of LPX2 and the instantaneous frequency shift of LPX2. This is because the timing of the frequency shift is aligned with the code phase. The receiver, locked on to LPX1, and using this information, synchronously changes the local oscillator (LO) used to receive LPX2 to the instantaneous frequency of LPX2. It can do that because the relationship between the instantaneous frequency of LPX2 and the LPX1 code phase is known a priori to all the nodes. Under such conditions, the LO's of the transmitters and receivers used in LPX2, the receivers being those in a PON 110 or in a mobile device detecting a PON ranging signal, are locked in frequency and hence the phase change as a function of LPX2 center frequency is related only to the distance between the nodes. This technique is good enough to resolve the carrier integer ambiguity among the nodes and hence allow for very accurate timing synchronization among the nodes. With carrier integer ambiguity resolved, the timing can be resolved to a fraction of a wavelength which is less than a nanosecond at 2.4 GHz. We shift the frequency of the carrier in our system, because for all intents and purposes, in our system, everything, e.g., the PONs 110 and the mobile device(s) 102, is hardly moving.

Additionally, any information that needs to be communicated between the mobile device 102 and the server 120 or the PONs 110 can use for example, WiFi, Bluetooth, or any other wireless communication standard/protocol. Hence LPX, LPY and LPZ may be modulated by a seemingly infinite, uninterrupted, and unaffected by data, PN sequence that is purely used for ranging and does not carry any information. Hence, there is no restriction on correlation length of time allowing for high processing gains and much improved SNR. Not having any data modulated on these ranging signals and locking all the nodes frequencies allows for theoretically unlimited correlation times and processing gains. These correlation times are limited only by the user dynamics requiring faster position update rate. For a mobile device 102 that is stationary or semi-stationary, the correlation time is unrestricted or minimally restricted respectively. This is useful for applications where high positional accuracy and high reliability, and hence high SNR, are required for a stationary user.

Returning to frequency locking, we can lock the frequencies of adjacent nodes (e.g., the PONs 110) using either main power line frequencies or by decoding LPX1's of adjacent nodes. A more robust method can combine these two methods. Relying on LPX1 only means relying on local oscillators within the PON 110 collocated in a light bulb. These oscillators have good absolute accuracies, on the order of <100 parts per million, but can drift in a short time specifically as a function of local temperature. The main power line however has poor absolute accuracy but drifts very slowly with time. In this hybrid method, we use the median of the LPX1 frequencies of the node as the true absolute frequency reference. We then measure the local mains power line in terms of this frequency. Subsequently we use the mains as a backup frequency source anytime there is loss of LPX1 signals. Hence LPX1 method provides the accurate frequency reference and the mains powerline frequency provides the hold over reference in case of loss of LPX1 signal detection thus keeping all the nodes phase locked.

Multiple Positioning Nodes within a Containing Device

In the following discussion, a PON may refer to the PON 110 having only one transmit path (e.g., the transmit chain 630) and one antenna (e.g., the antenna 610a) that may or may not have a receiver. In some embodiments, containing devices may contain only one PON 110. However, in some other embodiments, multiple PONs 110 may be collocated within a CD. In order for the mobile device 102 to determine its location, it needs to detect signals from at least four (4) such PONs 110 (e.g., PONs having a single antenna). In some instances, it is possible to place more than one PON 110 within a Containing Device. To be useful, the antennas of each PON should be separated from the antennas 610 of other collocated PONs 110 by a distance that allow for a good resultant mobile positional accuracy. The antennas 610 that are very close to each other result in Dilution Of Precision (DOP) due to poor geometry among PONs 110 and the mobile device 102.

For example, some light tubes can be as long as 5 ft. Building in two PONs 110 at each end of a light tube may yield sufficient geometry. More than two PONs 110 on the same tube may not be advantageous because the PONs 110 would then be collinear and may not yield additional ranging information. For this reason, given a room (e.g., the indoor environment 106), replacing two non-collinear, spatially separated light tubes with light tubes having two PONs 110 within them each, may fully instrument the room for accurate mobile position determination, provided a sufficient number of antennas 610 and signals 110. Please note that within the same Containing Device the two PON 110 circuits would run be synchronized and would share most of their circuit components.

We mention here that the antennas 610 of the PONs 110 may be spaced apart. Therefore, it might be possible in the case of smoke detectors, alarm sensors or light tube ballasts that these CDs would contain circuitry for multiple PONs 110 within them and have low profile RF cables, one cable for each included PON 110, emanating from these CDs with each RF cable terminated by a corresponding antenna 610. In the case of a smoke detector, these RF cables can be laid in a cross pattern on the ceiling. The cables and antenna can be placed above the dry wall ceiling to improve aesthetics. The same can be done for alarm sensors and ballasts, for example. If these antennas 610 at the ends of the RF cables can be spaced apart adequately, one would only need one CD per vicinity for good mobile position determination.

Position Determination Sequence

We now describe the operation of a mobile device that uses the PONs to determine its indoor location. The third component of the system is the server 120, communicatively coupled to the network 104 (e.g., the Internet).

We assume that the mobile device 102 already contains a WAN modem, a WiFi or Bluetooth modem and can communicate with a remote server through the Internet. Entering a given premises (e.g., the indoor environment 106), a mobile device can receive WiFi or Bluetooth signals emitted by the WiFi or Bluetooth modems in the light bulbs (e.g., the PONs 110) or emitted by, for example, a router installed in the room. These transmissions are not specific to location determination but may be part of registration and connection maintenance with the AP in case of WiFi signals for example. Such transmissions uniquely identify the sender. The PONs 110 may also infrequently use the co-located WiFi or Bluetooth modems to send Pilot Packets (PP) identifying the nodes (e.g., the PONs 110) and conveying code phase information of the PN spreading sequences. The mobile device 102 then communicates with the server 120 (LS) and conveys to the server the ID's of the WiFi or Bluetooth signals it is detecting. This can indicate to the server 120 coarse position information related to the position of the mobile device 102 within the indoor environment 106.

The mobile device 102 can also convey to the server 120 the desired level of accuracy it needs and what capabilities it has in terms of being able to decode LPX, LPY or LPZ signals. Using this information, the server 120 determines the coarse location of the mobile and conveys to the mobile aiding information about the nearby PONs as well as the status of these PONs 110. Such information includes the physical location of the PONs 110 relative to the room datum, the center frequency of LPX's, LPY's and LPZ ranging signals and the code offset of each node along with the code phase. We mentioned previously that the codes used to spread the ranging signals have a very long cycle. Therefore, exhaustive search for code phase is not feasible. To aid in code acquisition, the Pilot Packets (PP) that the PONs 110 transmit periodically and/or infrequently, contain the code phase in addition to the unique identification information that was used to get the correct aiding information. Including the code phase in these Pilot Packets drastically reduces the code search space to a handful of code phase correlator searcher hypotheses. We also include the code phase with the aiding information from the server 120, but given the unpredictable Internet delays, this still results in a large code search space, especially with the faster chip rate codes of LPY and LPZ. The Pilot Packets emitted by each PON 110 are emitted at random times and using very low duty cycles, seconds. In some examples, the mobile device 102 can receive one PP from one PON 110 to derive all the information it needs to narrow the search for all the others nearby PONs 110. This is because the PONs 110 can all be synchronized and the code offset among them is provided in the aiding information packet from the server 120.

Alternatively, the PONs 110 can emit a PN spread ranging signal with much shorter code that is aligned with LPX, LPY or LPZ. While shorted codes have less ranging accuracy, they can be used to find the code phases of the longer codes. This is because searching all possible hypothesis of the short code is feasible. Once the short code timing is detected, this timing is used to lock onto the other long codes with the superior ranging capabilities. Locking to the short code of one PON uniquely identifies that PON. This information is conveyed to the server 120 to obtain the needed aiding information for a position fix.

The mobile device 102 can use all of this information to look for the ranging signals. Locking onto the ranging signals with the required accuracy, the mobile device 102 can then to use TDOA technique to measure the free air delay from each PON 110 to itself and hence the distance from itself to each detected PON 110. Knowing these distances and the location of the PONs 110 as provided by the server 120, the mobile device 102 can calculate its position within the room (e.g., the indoor environment 106) relative to the positions of the PONs 110 and the room datum (e.g., coarse position). The mobile device 102 can then transmit a report of its own location to the server 120 to aid in continued system improved accuracy and to optimize performance for all the mobile devices 102 within the vicinity. The report can include the calculated position of the mobile device 102, a confidence metric as to the accuracy of the solution derived from received SNR and multi path detection, the detected PONs and which of the LPX, LPY and/or LPZ signals were used in the position determination, along with their relative detected power and phase, among other details. The report can include the raw timing measurements of the ranging signals as received by the mobile device 102.

We mentioned before that mobile devices 102 can have very accurate frequency reference because of frequency locking to the cellular network. These mobile devices 102 also include in their location report to the server 120 the frequency offset between their own reference oscillator and the center frequencies of the PONs 110. This can help the server 120 detect and instruct the PONs 110 within the vicinity to correct their reference oscillators. The report is mainly intended to help the server 120 manage the PONs 110 including adjusting the output power of each PON 110 to minimize the near-far problem or to direct equal PONs 110 signal power to a mobile device 102 on one side of the room in situations where high accuracy is needed and few if any other mobile devices 102 are in the room. If all the mobile devices 102 requiring position solutions within a vicinity (e.g., the indoor environment 106) detect a PON 110 signal (e.g., the signals 112) at much higher power level than other PON signals, the server can instruct this "loud" PON 110 to reduce output power levels of its ranging signals so as not to mask off signals from other PONs 110.

In some embodiments, as the number of mobile devices 102 in the room increases and their physical distribution with the room spreads, it may become more difficult to accommodate all of them and the server 120 may attempt a best effort algorithm to minimize the effect of the near-far issue while maintaining the required fairness towards users. Real-time transmitted power adjustment as instructed by the server 120 can compensate for the unpredictable RF environment that the smart light bulbs smoke detectors or alarm modules (e.g., the PONs 110) would experience within a given light fixtures. For example, one light fixture would recess the light bulb deep within a metal case while other fixtures would have the light bulb fully exposed. The RF vicinity. The RF path attenuation experienced by one bulb detector could differ significantly differ from RF path attenuation experienced by other bulbs, detectors, or other CDs. The location reports returned by the mobile devices 102 may provide a way to compensate for these variations and allows the server 120 to adjust the output power of each PON 110. This may reduce the difference in received signal strengths at the mobile device 102 from the various PONs 110.

Furthermore, the near-far issue may be further mitigated by the fact that any node 110 transmitter operated 50% of the time can allow for far PONs 110 to be heard.

In some embodiments, two types of location determination can be implemented. The first location determination method can be initiated by the mobile device 102, as described above.

A second method for location determination can be initiated by the server 120. The server 120 can send a location request to the mobile device 102. The location request can include the required level of accuracy. The mobile device 102 can then initiate an aiding information request similar to that described in connection with the location determination initiated by the mobile device 102. The mobile device 102 can elect to accommodate the level of accuracy that is required by the request from the server 120 or choose a different level of accuracy based on its own capabilities and settings. This can be affected by a privacy setting implemented at the mobile device 102 (e.g., by the user). In a private mode, the mobile device 102 can anonymously aiding information and may or may not send back an anonymous location report to the server 120. Similarly, the server 120 can allow various levels of accuracy by providing limited aiding information depending on the settings of the owner of the premises. Encryption may be used for the messages exchanged among the mobile device 102 and the server 120 to protect privacy and security of the information.

Interchangeable Transmit and Receive Roles

So far we've described that the PONs 110 transmit a ranging signal while the mobile device 102 receives the ranging signal(s) and determines its location. This is advantageous as it allows for unlimited number of simultaneous and demanding users with frequent updates. In some circumstances, specifically with low number of users with low frequency of positioning updates, it might be advantageous for the mobile device 102 to emit a ranging signal similar to LPX, LPY or LPZ and have the PONs 110 receive the signal and report to the server 120 the respective time of arrival of the emitted signal to the server where a position of the mobile device is computed. The preferred embodiment of the system is for the PON 110 to transmit the ranging signal and for the mobile devices 102 to receive them and determine their location. However, the system 100 can operate in either mode and can also operate where the PONs 110 are transmitting the ranging signal (e.g., the signals 112) for mobile device 102 to determine their location while at the same time listening for low duty cycle ranging signals coming from low update transmitting mobile devices.

System Installation

In some embodiments, some or all the light bulbs, smoke detectors, and/or alarm modules within the indoor environment 106 can be replaced with smart devices (or CDs) containing the PONs 110. For proper operation, these PONs 110 need to frequency lock and synchronize among themselves as described in the foregoing. In addition, the physical location of the CDs/PONs 110 should be known to the server 120 so that the server 120 can convey this information as part of the aiding information packet it sends to the mobile device 102 entering the indoor environment 106. It is important to note here that the physical position of the PON 110 relates to the center of radiation of the antenna 610 used by the PON 110. This may or may not correspond to a physical feature of the light bulb smoke detector or alarm sensor so physical surveying methods, such as surveying equipment, may not yield the desired values. Instead, we shall use an inverse algorithm to determine the physical locations as needed by the server for proper and accurate operation.

From the foregoing, the mobile device 102 should detect the signals (e.g., the signals 112) from, and measure the distance to, a minimum of four PONs to determine the location of a mobile within the room. The minimum of four PONs 110 is predicated on each PON 110 having a single antenna 610. If the PONs 110 have more than one antenna 610, the number required may decrease. For ease of description, the following assumes the PONs 110 have one antenna 610.

In reverse, if the mobile device 102 measures the ranging signals from all the PONs 110 at four known points within the room, then there is sufficient information to determine the location of all the PONs 110, or the CDs, as the case may be.

For example, assuming that CDs or the smart light bulbs, smoke detectors, and alarm sensors containing PONs 110 are already installed, are communicating with the server 120, and that their PONs 110 have already achieved frequency lock and clock time alignment. Let's also assume that our datum for the room (e.g., the indoor environment 106) is the point where the right side of the door frame on the entry of the room intersects the floor. The mobile device 102 having the required hardware and software to receive the ranging signals 112 emitted by the PONs 110 can be configured in a survey mode rather than normal, location-determination mode. Survey mode, in this example, performs all the operation as in normal mode except instead of calculating the position and returning that to the server 120 it only returns to the server 120 the TDOA of all the ranging signals 112 received by the mobile device 102. In survey mode, the mobile device 102 can be placed sequentially in various locations (e.g., at the 4 corners) of the door at the entry of the indoor environment 106. The mobile device 102 can then perform required RF measurements and convey the results to the server 120 along with an identification of the corner at which the measurement was taken. From such measurements, the server 120 now has sufficient information to determine the location of the PONs 110 within the space (e.g., the indoor environment 106).

An alternate method is to slowly trace the frame of the door with the mobile device 102. The mobile device 102 can take continuous readings along each side. This method may also give sufficient information to yield the position of the PONs 110. Since the door frame is typically planar, there is an ambiguity about which side of the door the PONs 110 reside. One additional measurement at any point inside the room in sufficient to resolve this ambiguity. Finally, the dimensions of the door need to be measured and conveyed to the server 120. This is easy since in most buildings, the doors are of equal size. The method yields as good of an accuracy as how accurately the user places the mobile when prompted. It is simple and perhaps accurate enough for residential applications and office spaces.

Another method yielding higher accuracy uses a rigid board with four or more receiving antennas used by special receiving hardware that alternately uses and processes signals from each antenna. The antennas locations relative to themselves and relative to a clear datum on the board are precisely set during manufacturing. We place this board within the room and the receiver in the board proceeds to take measurements from each antenna in turn and conveys the information wirelessly to the server 120. Because of the precise relative location of these antennas to themselves and to the datum point on the board, we now know with precision the location of the PONs 110 relative to the location of these antennas and the datum on the board. We use survey techniques to relate the datum point indicated on this board to a datum point of the room, such as a door corner. This relative location between the two datums is uploaded to the server. This technique may be more useful for commercial installations.

One can envision other techniques with varying complexity and accuracy to map the locations of the PONs 110 and upload them to the server 120. The main theme here however is placing the mobile device 102 or equivalently equipped receiver at four or more known points within the room and conveying the measurements of the TDOA among the detected PONs 110 to the server 120. From this information, the server 120 can determine the position of the PONs 110 within a space. The more accurate we place the surveying receiver during these measurements, the more accurate the calculation of the position of the PONs 110 will be.

One feature of the system is detection of positional errors of the PONs 110. Some light bulbs could be installed in portable movable fixtures. As noted above, before the mobile device 102 can determine its location, it transmits a location report to the server 120 including the computed location of the mobile device 102. Such a report may contain the raw timing of the ranging signals as seen by the mobile device 102. If any fixture smoke detector or alarm sensor is moved, it's timing relative to other PONs 110 changes from what was measured during clock alignment. Also, in an over-determined solution, the mobile device 102 can detect that based on time measurement, no reasonable solution can be returned, given the stated positions of the PONs 110 as recorded at the server 120. This gives enough information for the server 120 to detect that one or more PONs 110 have moved. At this point, the system 100 (e.g., the server 120) can initiates a synchronization procedure to realign the clocks of each of the PONs 110. In addition, the redundant location solutions can be used to determine which fixture has moved and to where. Once the clocks are realigned and the new location of the fixture or CD is determined, the server 120 is ready again to provide consistent aiding information. All the above happens automatically because the mobile devices 102 can continuously share the location report data with the server 120 after a location determination operation.

In an embodiment, the server 120 can instruct the mobile device 102 when to send the location determination report. For example, once a mobile device 102 enters the room, and receives the aiding information from the server 120, it generally does not need to get the aiding information packet for subsequent position updates. This is because the aiding information does not change frequently within the same vicinity (e.g., the indoor environment 106). Also, the server 120 may not want to receive a location determination report from the mobile device 102 after every location update. The server 120 therefore can instruct the mobile device 102 as to the frequency of when to send a report or alternately specify events after which a report is desired such as a minimum distance movement. The above reduces the amount of traffic that is exchanged between the mobile devices 102 and the server 120. For example, in congested venues, the server 120 may request location reports from a few of the mobile devices 102 present. It also may limit the content of the report. For example, the server 120 may instruct one or more mobile devices 102 to send location reports containing only their locations, allowing other mobile devices 102 in the vicinity to send more or additional information. This can reduce the required traffic while maintaining all the functionality of continuous tuning and performance enhancement.

Those of skill will appreciate that the various illustrative logical blocks (e.g., the various servers described herein), modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or block without departing from the disclosure.

The various illustrative logical blocks and modules (e.g., the various servers described herein) described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

What is claimed is:

1. A system for determining a location of a mobile device within an indoor environment, the system comprising:
    a first positioning node (PON) configured to transmit a first modulated signal;
    a second PON disposed in a different location than the first PON and configured to transmit a second modulated signal; and
    a server configured to
      receive a request from the mobile device indicating a coarse location of the mobile device,
      transmit location information for the first PON and the second PON based on the request, and signal information related to the first modulated signal and the second modulated signal; and
      receive a position report from the mobile device, the position report being based on a difference in time between the first modulated signal and the second modulated signal at a time of arrival at the mobile device.

2. The system of claim 1 wherein the second modulated signal is synchronized in time and frequency with the first modulated signal at a time of transmission.

3. The system of claim 1 wherein the first PON and the second PON are collocated with a containing device, the containing device being an in-home electronic device.

4. The system of claim 2 wherein the first modulate signal and the second modulated signal are transmitted below an ultra-wideband (UWB) mask set for indoor UWB transmissions.

5. The system of claim 1 wherein the first modulated signal and the second modulated signal are direct sequence spread spectrum (DSSS) signals separated by at least one spreading chip.

6. The system of claim 1 wherein the first PON and the second PON are collocated within a single containing device.

7. The system of claim 1 wherein the first PON and the second PON are disposed within different containing devices.

8. The system of claim 7 wherein the first PON and the second PON are coupled to a common power main and are configured to synchronize the first modulated signal and the second modulated signal based on a frequency of the common power main.

9. The system of claim 8 wherein,
    the first PON is further configured to transmit a first timing signal via the power main;
    the second PON is further configured to transmit a second timing signal via the power main, the first timing signal and the second timing signal having a frequency several orders of magnitude the frequency of the common power main;
    the first PON is further configured to adjust a local reference oscillator based on the second timing signal and one or more received other timing signals; and
    the second PON is further configured to adjust a local reference oscillator based on the first timing signal and the one or more received other timing signals.

10. The system of claim 1 wherein the first PON and the second PON are configured to:
    receive one or more other modulated signals;
    determine a frequency and time offset between a respective one of the first modulated signal and the second modulated signal and the one or more other modulated signals; and
    adjust a frequency of the respective one of the first modulated signal and the second modulated signal to synchronize frequency and time with the one or more other modulated signals.

11. The system of claim 1 wherein the first modulated signal and the second modulated are transmitted intermittently at the respective first PON and second PON.

12. A method for determining a location of a mobile device within an indoor environment, the method comprising:
    transmitting, by a first positioning node (PON), a first modulated signal;
    transmitting, by a second PON disposed in a different location than the first PON, a second modulated signal ;
    receiving, at a server, a request from the mobile device indicating a coarse location of the mobile device;
    transmitting, by the server, location information related to first PON and the second PON based on the request, and signal information related to the first modulated signal and the second modulated signal; and receiving, at the server, a position report from the mobile device, the position report being based on a difference in time between the first modulated signal and the second modulated signal at a time of arrival at the mobile device.

13. The method of claim 12 wherein the second modulated signal is synchronized in time and frequency with the first modulated signal at a time of transmission.

14. The method of claim 12 wherein the first PON and the second PON are collocated with a containing device, the containing device being an in-home electronic device.

15. The method of claim 12 wherein the first modulated signal and the second modulated signal are direct sequence spread spectrum (DSSS) signals separated by at least one spreading chip.

16. The method of claim 12 wherein the first PON and the second PON are coupled to a common power main and are configured to synchronize the first modulated signal and the second modulated signal based on a frequency of the common power main.

17. The method of claim 16 wherein,
the first PON is further configured to transmit a first timing signal via the power main;
the second PON is further configured to transmit a second timing signal via the power main, the first timing signal and the second timing signal having a frequency several orders of magnitude the frequency of the common power main;
the first PON is further configured to adjust a local reference oscillator based on the second timing signal and one or more received other timing signals; and
the second PON is further configured to adjust a local reference oscillator based on the first timing signal and the one or more received other timing signals.

18. A method for determining a location of a mobile device within an indoor environment having one or more positioning nodes (PONs), the method comprising:
determining, at a mobile device, a coarse location of the indoor environment;
transmitting a request to a server including the coarse location;
receiving aiding information from the server based on the coarse location;
receiving a first positioning signal from a first antenna;
receiving a second positioning signal from a second antenna, the second positioning being out of phase with the first positioning signal;
receiving a third positioning signal from a third antenna, the third positioning signal being out of phase with the first positioning signal and the second positioning signal; and
determining a position of the mobile device based on a one-way time-difference of arrival (TDOA) between the first positioning signal, the second positioning signal, and the third positioning signal.

19. The method of claim 18, wherein the first positioning signal, the second positioning signal, and the third positioning signal are transmitted using direct sequence spread spectrum (DSSS).

20. The method of claim 18, wherein the first antenna, the second antenna, and the third antenna are collocated within the same PON.

* * * * *